April 22, 1958  J. C. HOLLIS  2,831,361
MACHINE TOOL FEED TRANSMISSION AND CONTROLS THEREFOR
Filed Aug. 3, 1955  10 Sheets-Sheet 1

INVENTOR.
John C. Hollis
BY
Carlson, Pitzner, Hubbard & Wolfe
Attys

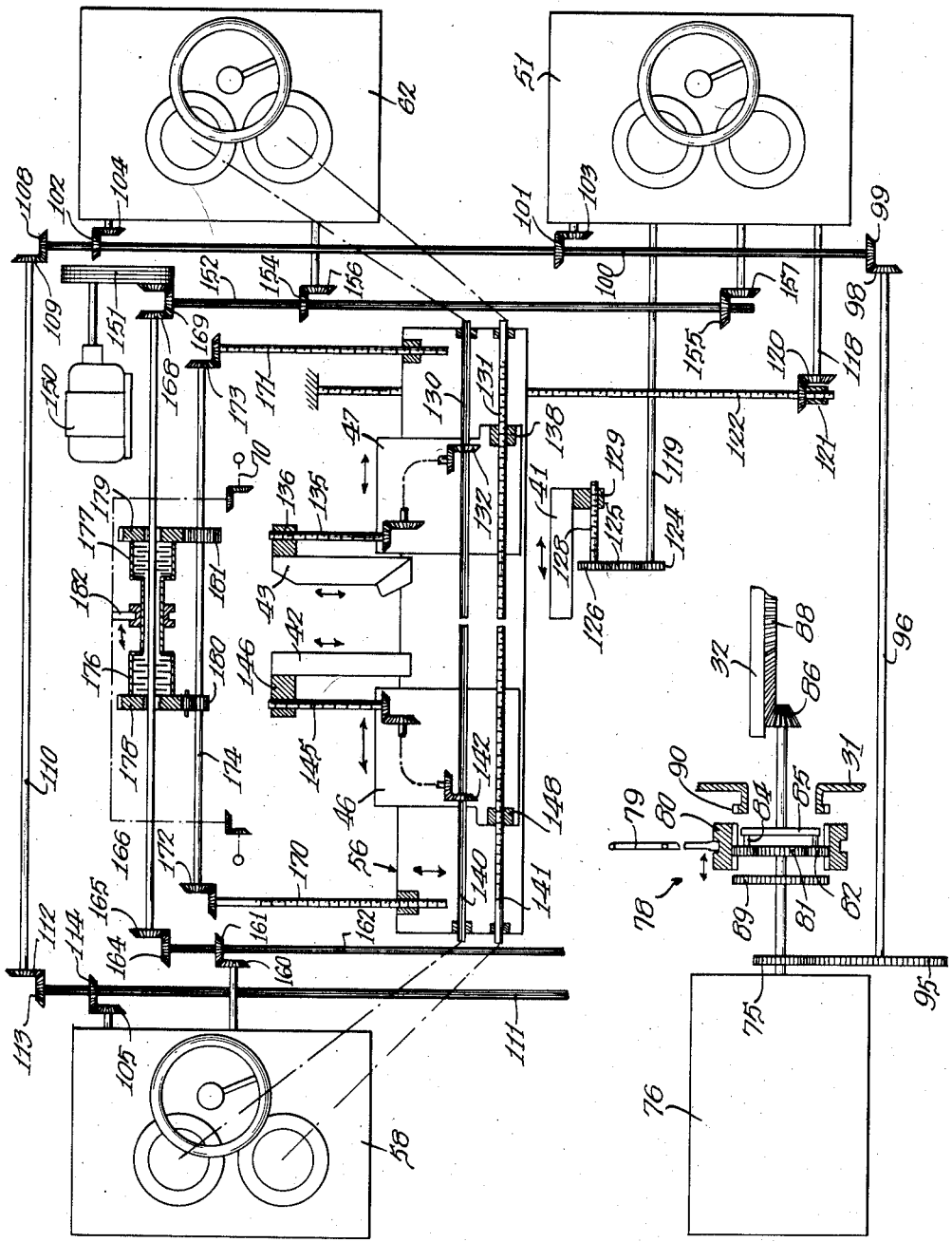

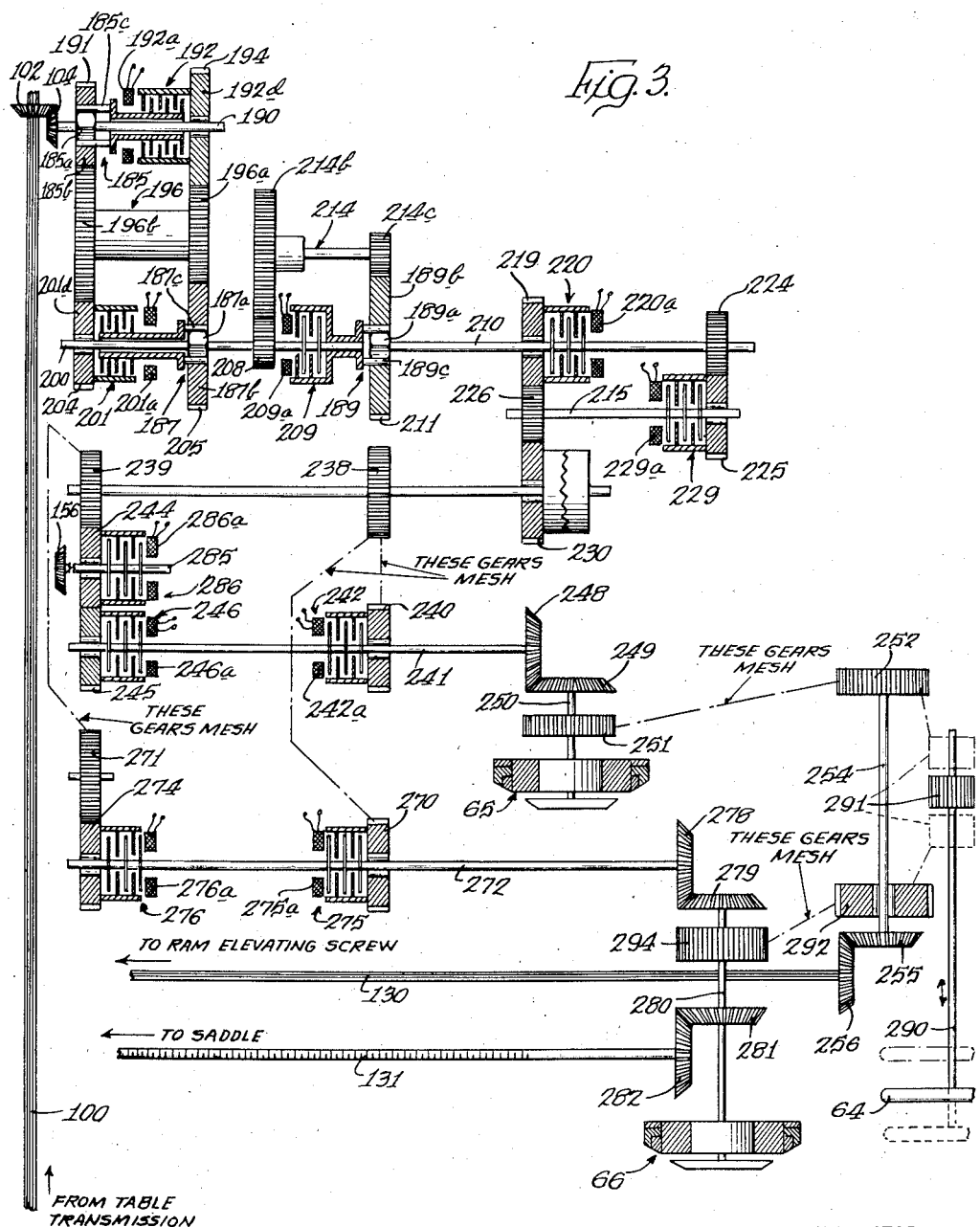

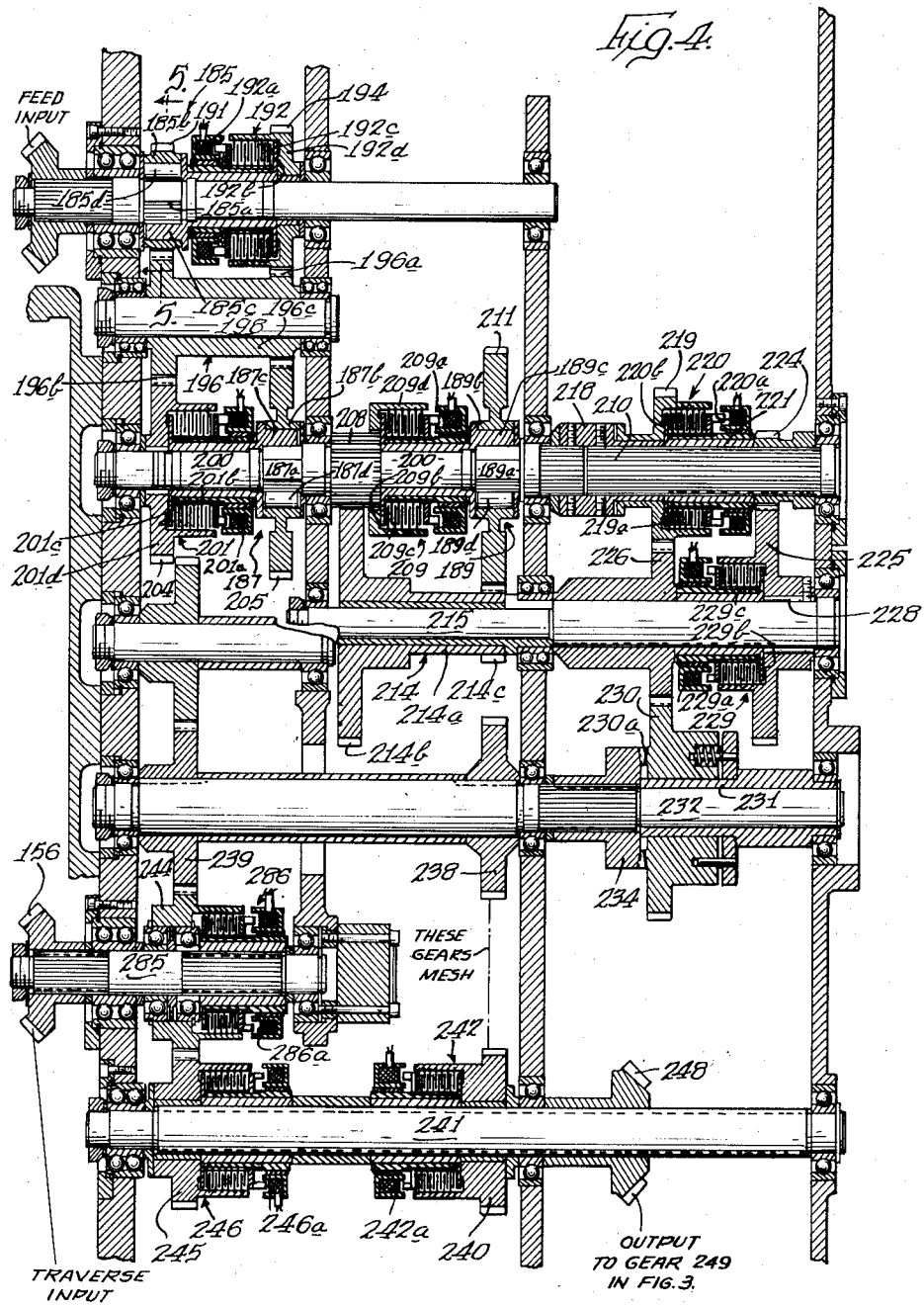

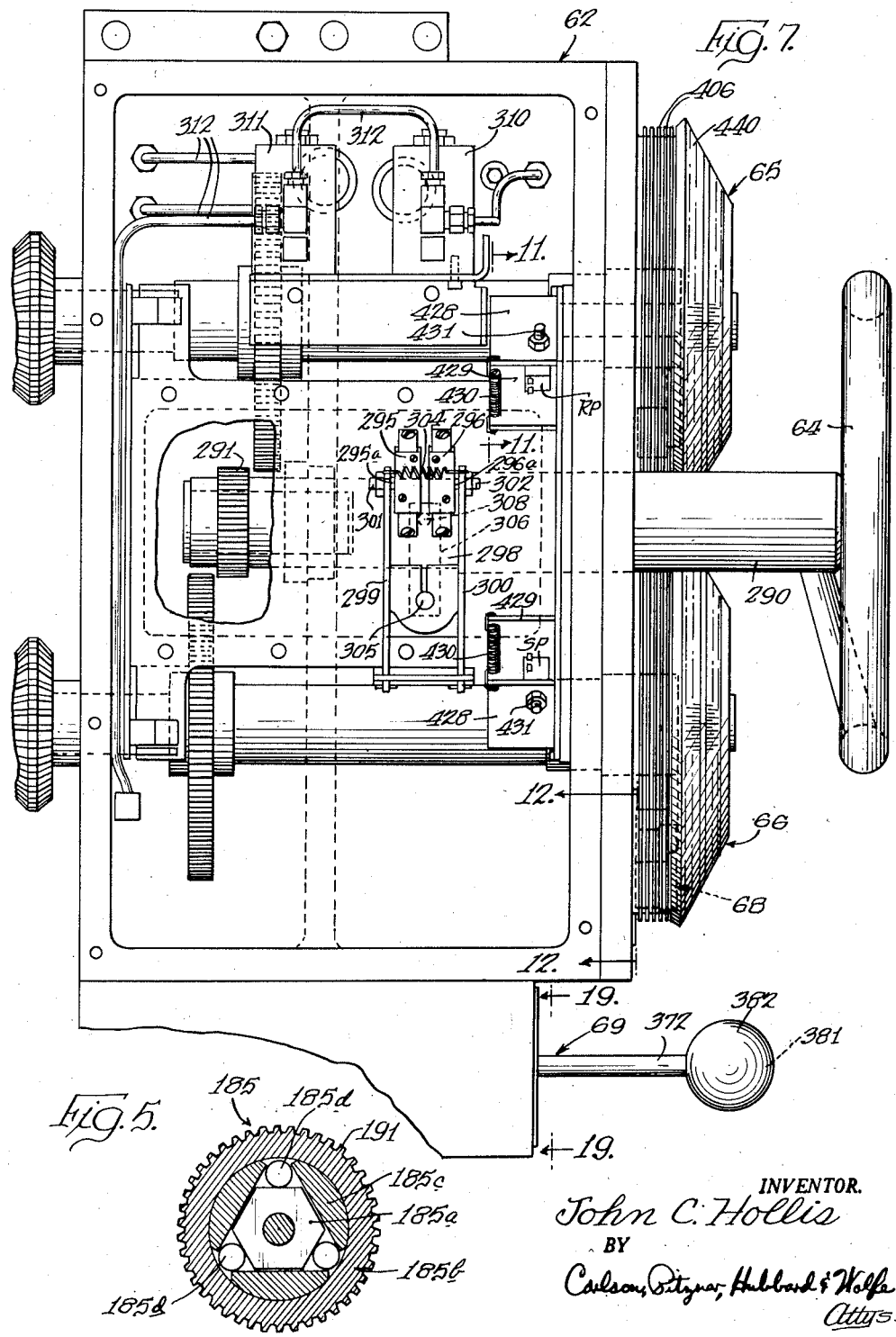

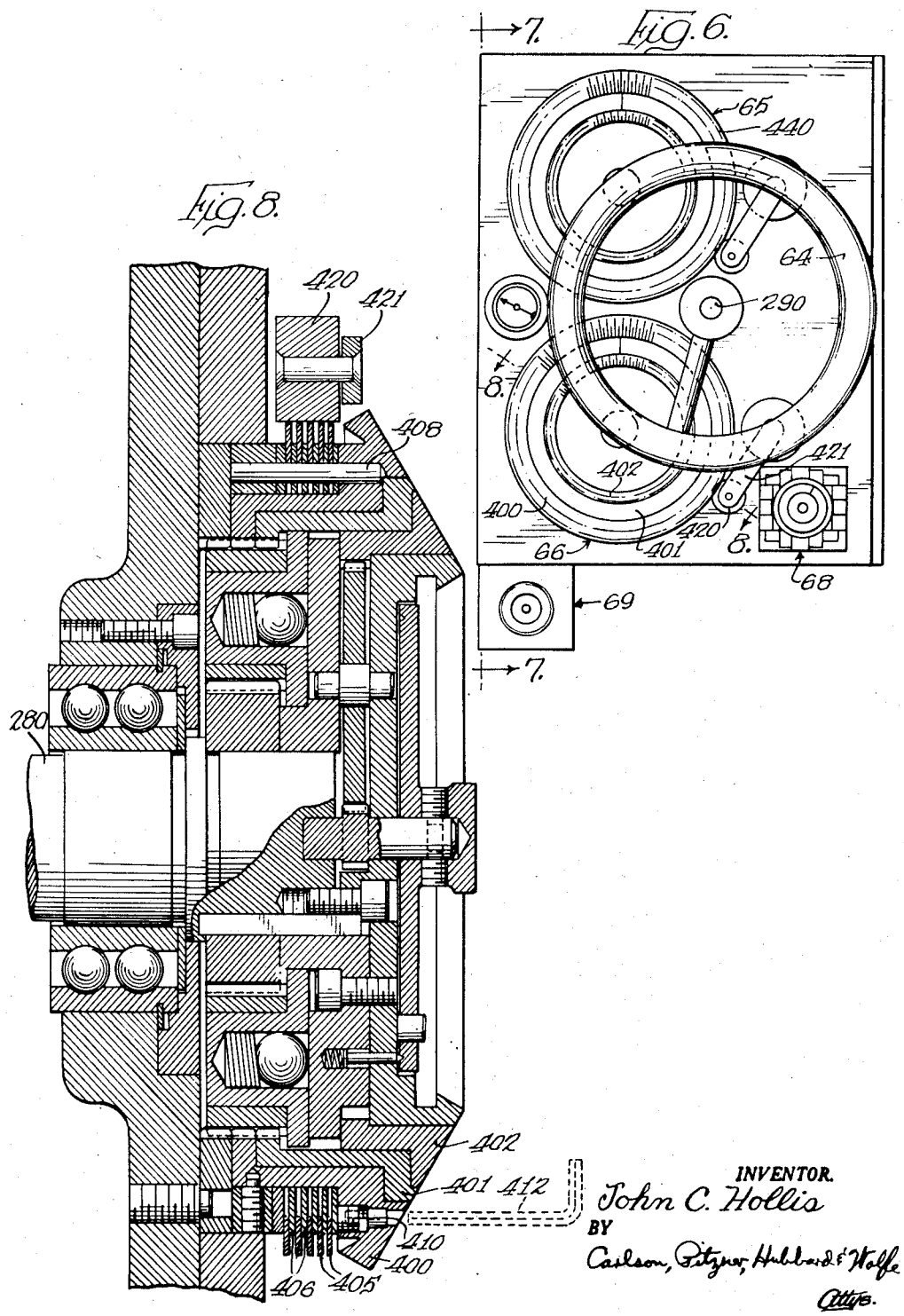

April 22, 1958 J. C. HOLLIS 2,831,361
MACHINE TOOL FEED TRANSMISSION AND CONTROLS THEREFOR
Filed Aug. 3, 1955 10 Sheets-Sheet 7
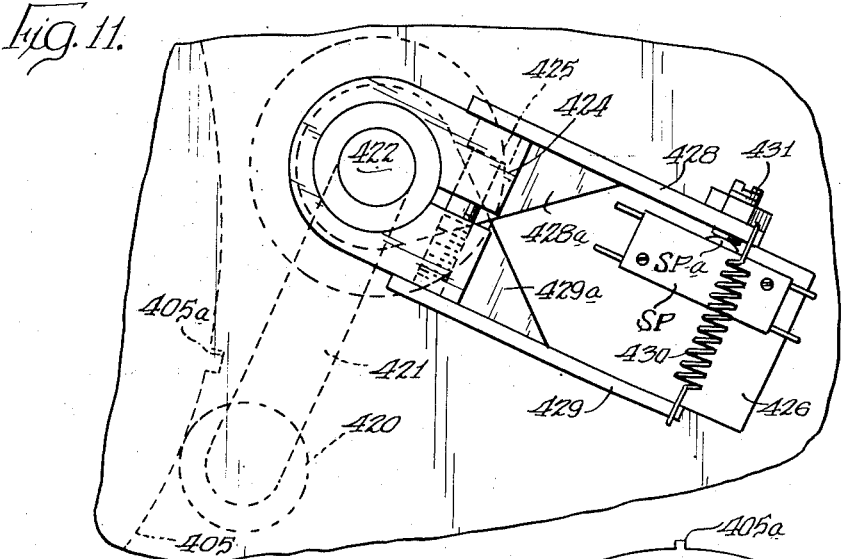
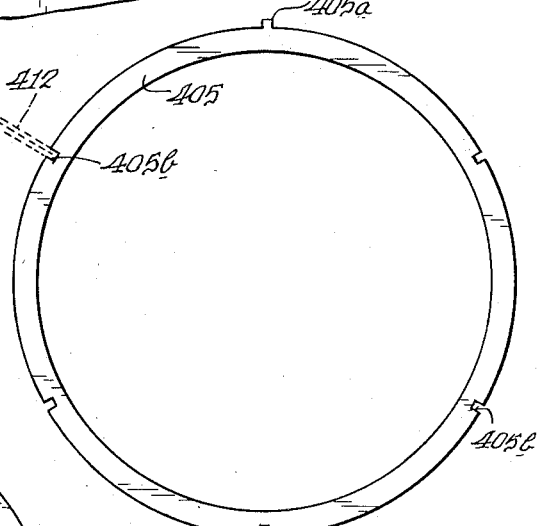
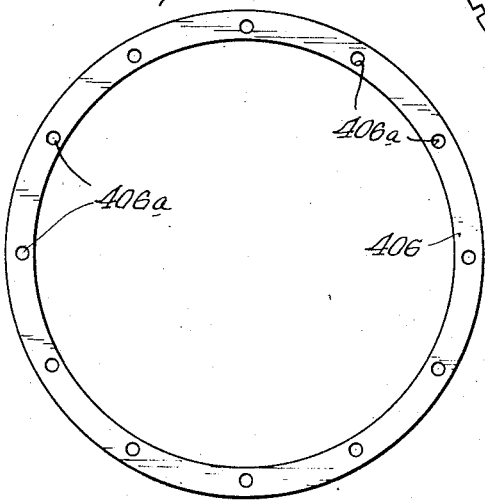
INVENTOR.
John C. Hollis
BY
Carlson, Pitzner, Hubbard & Wolfe
Attys.

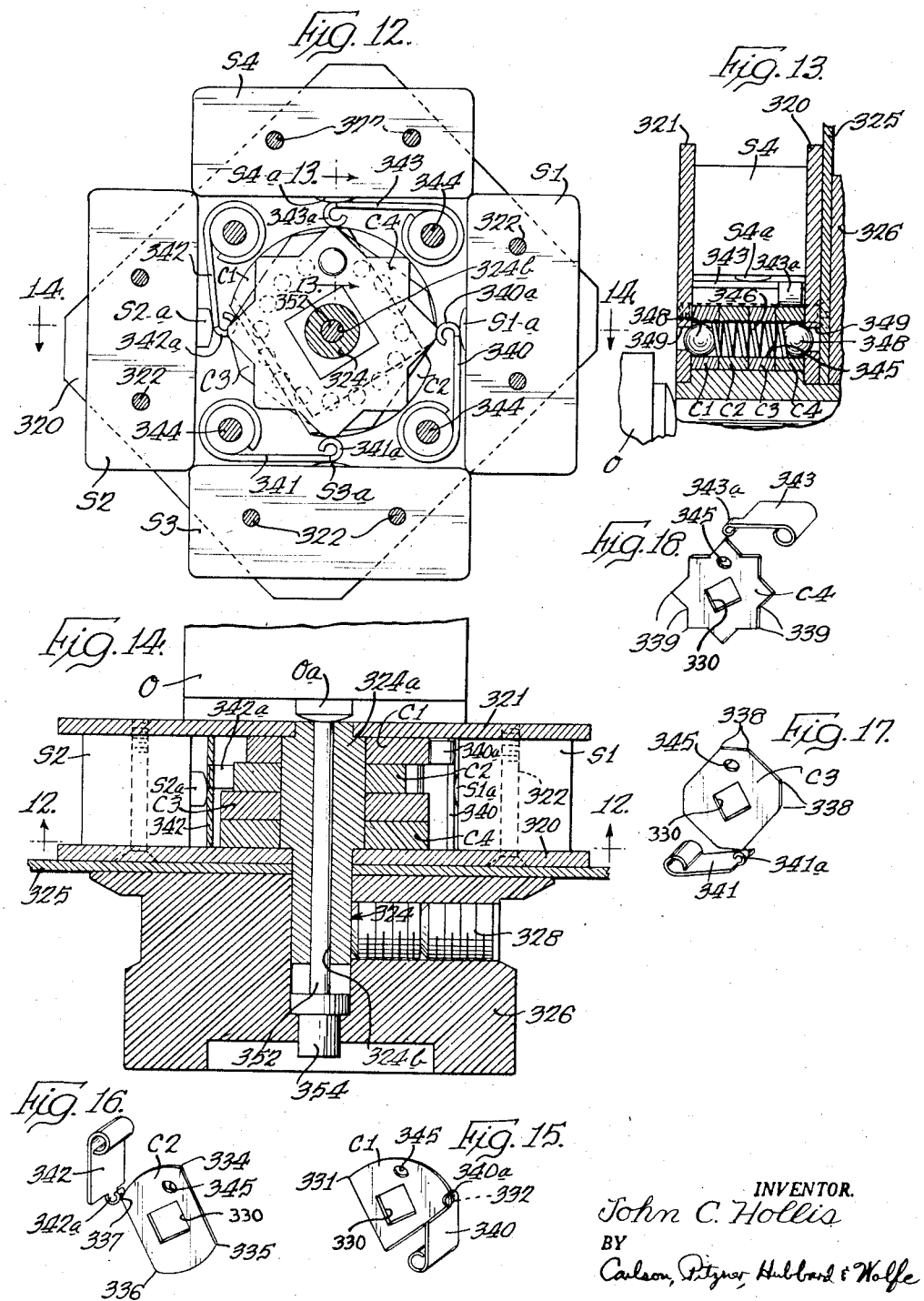

April 22, 1958     J. C. HOLLIS     2,831,361
MACHINE TOOL FEED TRANSMISSION AND CONTROLS THEREFOR
Filed Aug. 3, 1955     10 Sheets-Sheet 9
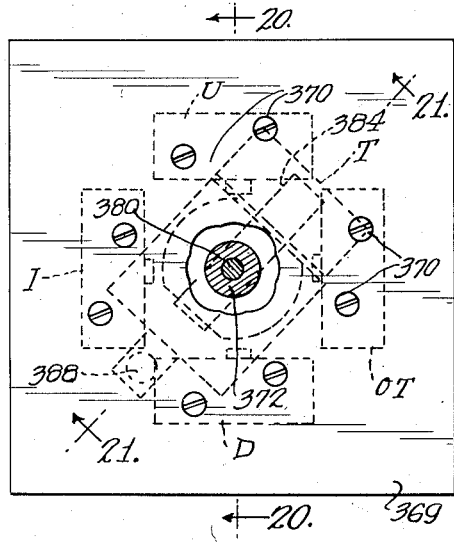
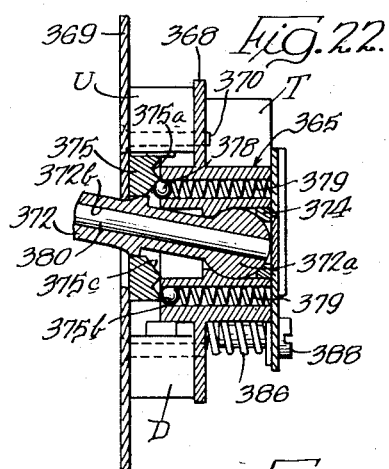
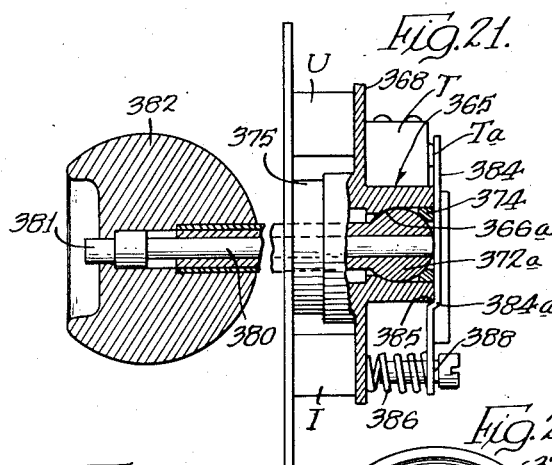
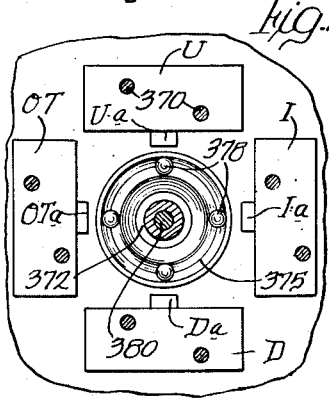
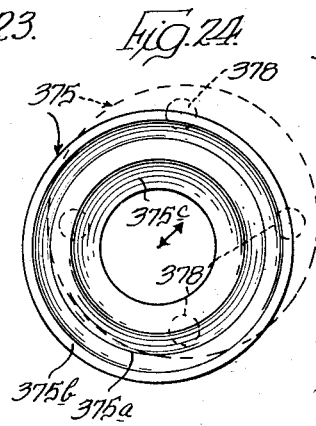
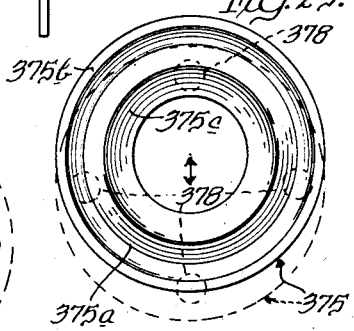
INVENTOR.
John C. Hollis
BY
Carlson, Pitzner, Hubbard & Wolfe
Attys April 22, 1958   J. C. HOLLIS   2,831,361
MACHINE TOOL FEED TRANSMISSION AND CONTROLS THEREFOR
Filed Aug. 3, 1955   10 Sheets-Sheet 10
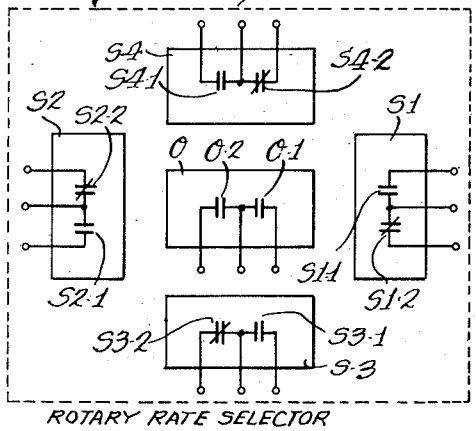
ROTARY RATE SELECTOR
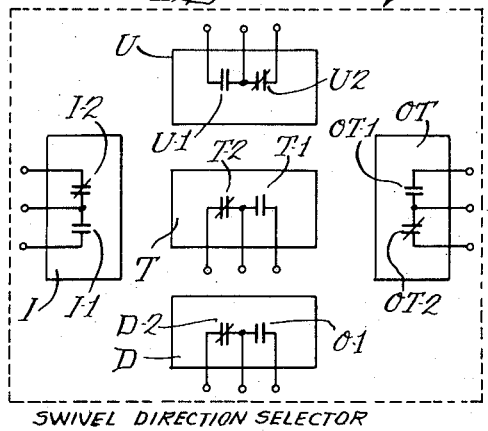
SWIVEL DIRECTION SELECTOR
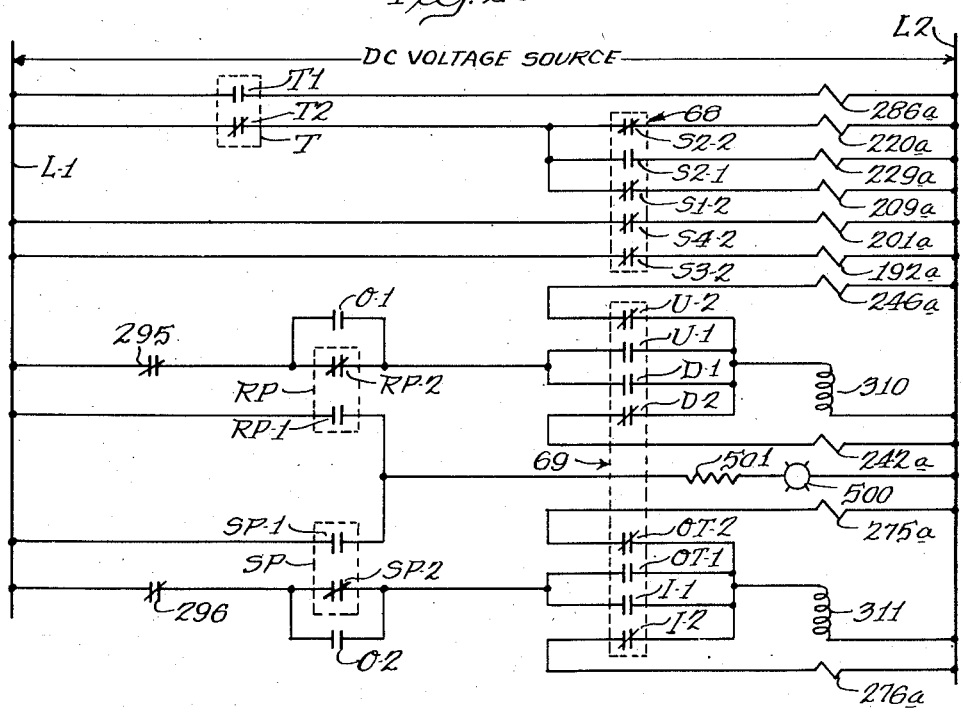
INVENTOR.
John C. Hollis
BY
Carlson, Pitzner, Hubbard & Wolfe
Attys.

United States Patent Office 2,831,361
Patented Apr. 22, 1958

2,831,361

MACHINE TOOL FEED TRANSMISSION AND CONTROLS THEREFOR

John C. Hollis, Fond du Lac, Wis., assignor to Giddings & Lewis Machine Tool Company, Fond du Lac, Wis., a corporation of Wisconsin Application August 3, 1955, Serial No. 526,272

18 Claims. (Cl. 74—365)

The present invention relates generally to machine tools which have translatable elements such as tool holders. More particularly, the invention relates to transmissions and controls for feeding translatable elements at any of a plurality of rates.

It is the general aim of the invention to simplify the organization of multiple ratio feed transmissions, to reduce the space requirements for feed transmissions of a given torque capacity and available number of feed rates, and to enable selection of feed rates, directions and distances with only finger-tip manipulation of control components on the part of an operator.

An important object in this connection is to provide a multiple ratio feed transmission in which all gears are permanently meshed, in which changes in the drive ratio may be made while feeding is in progress and the transmission parts are in motion, yet which may be reversibly driven from a power source or prime mover.

It is a further object to provide such a transmission in which changes in drive ratio or feed rate may be effected simply by engaging or disengaging a single clutch, and which lends itself readily to feed rate selection by setting a small hand knob of a rotary selector switch assembly.

An additional object is to provide for the reversible feed of two translatable elements from the same multiple ratio transmission, one moving relative to and at right angles to the other, together with simplified and convenient control means for selecting the resultant movement of one of the elements to be in any of eight directions.

The invention further contemplates the creation of an extremely compact and reliable swivel direction selector switch assembly in which four switches are actuated singly or in four groups of two in response to the deflection of a swivel lever in eight respective directions from a central position.

A further object is to provide for automatic termination of feed and automatic positioning of a translatable element by feed-terminating means actuated by engagement with a member adjustably carried on a scale which rotates in proportion to translation of the element and serves to indicate the position of the latter.

In this connection, it is an object to provide automatic positioning means which are extremely compact, and located near the control instrumentalities of the machine so that an operator may change the predetermined stopping positions without moving from his control station.

Other objects and advantages will become apparent as the following description proceeds, taken in conjunction with the accompanying drawings in which:

Fig. 2 is a diagrammatic illustration of the arrangement in the machine tool for transmitting power to its several translatable elements;

Fig. 3 is a schematic representation of the feed transmission employed in each of the machine heads;

Fig. 4 is a developed sectional illustration of a feed transmission;

Fig. 5 is a section view taken substantially along the line 5—5 in Fig. 4 and illustrating the construction of a bi-directional overrun device;

Fig. 6 is a front elevation of the right head of the machine illustrated in Fig. 1;

Fig. 7 is a vertical section taken substantially along the line 7—7 in Fig. 6;

Fig. 8 is a sectional view taken substantially along the line 8—8 in Fig. 6 and showing details of a position-indicating scale and trip means associated therewith;

Figs. 9 and 10 are detail views of trip and spacer rings, respectively, carried by the scale shown in Fig. 8;

Fig. 11 is a detail view taken substantially along the line 11—11 in Fig. 7 and showing the physical mounting of a trip switch;

Fig. 12 is a vertical section taken substantially along the line 12—12 in Fig. 7 and illustrating the construction of a rotary selector switch assembly;

Figure 1:
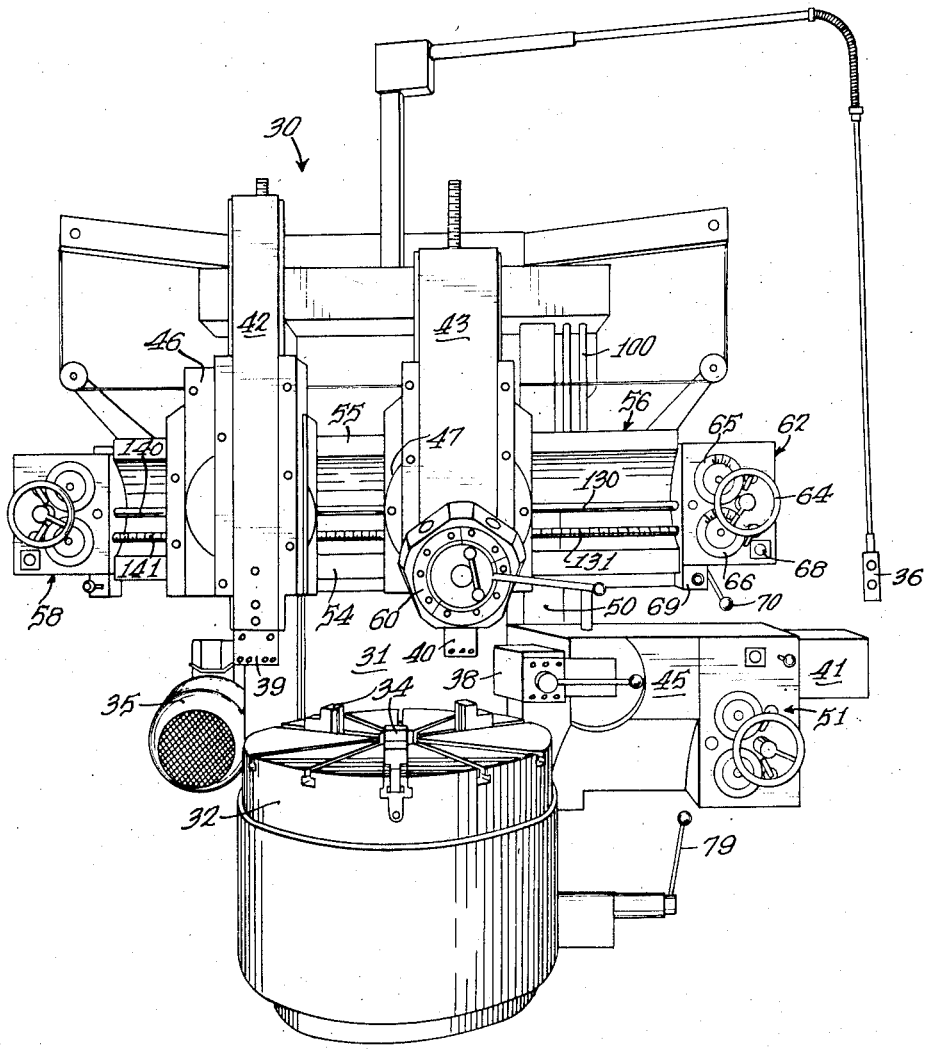
Figure 1 is a front elevation of an exemplary machine tool having a feed transmission and controls embodying the features of the present invention.

Figs. 13 and 14 are sections taken substantially along the lines 13—13 and 14—14, respectively in Fig. 12;

Figs. 15, 16, 17 and 18 are detail views, in perspective, of cams and trip plates employed in the rotary selector switch assembly illustrated by Figs. 12-14;

Fig. 19 is a front elevation, partially in section taken along the line 19—19 in Fig. 7, illustrating the construction of a swivel direction selector assembly;

Figs. 20 and 21 are sections taken substantially along the lines 20 and 21, respectively, in Fig. 19;

Fig. 22 is similar to Fig. 20 although illustrating the swivel lever in a deflected position;

Fig. 23 is a detail view taken substantially along the line 23—23 in Fig. 20;

Figs. 24 and 25 are elevational views of a wobble plate employed in the direction selector assembly, showing the wobble plate moved in two respective directions from its central position;

Figs. 26 and 27 are schematic electrical representations of the rotary selector switch and the swivel direction selector switch assemblies shown in Figs. 12 and 19, respectively; and Fig. 28 is a schematic wiring diagram of the electrical control circuit employed with the feed transmission.

While the invention has been shown and is described in some detail with reference to a particular embodiment thereof, there is no intention that it thus be limited to such detail. On the contrary, it is intended here to cover all modifications, alternative constructions and equivalent falling within the spirit and scope of the invention as defined by the appended claims.

Exemplary machine

To make clear the environment of the present invention, it has been illustrated as employed on an exemplary machine tool here shown (Fig. 1) as a vertical turret lathe 30. In general terms, the lathe comprises an upright casting forming a base or housing 31 journaling a work support support or table 32 which is rotatable about a vertical axis and provided with means such as chuck jaws 34 for holding a variety of workpieces. The table 32 is driven from a main motor 35 through a multi-speed transmission (not shown) contained within the lower portion of the housing 31 and controlled by instrumentalities on a movable pendant 36. The table speed transmission may be, of example, of the type disclosed and claimed in applicant's copending U. S. application Serial No. 525,469, filed August 1, 1955, and permiting operation of the table at any one of 32 speeds.

For turning, facing, drilling, threading, and performing numerous other machining operations on various workpieces that may be locked to the table by the chuck jaws 34, the turret lathe 30 further includes three alternatively usable tool holders 38, 39 and 40 supported on three respective elements each of which is translatable optionally in any of eight different directions. For this purpose, three primary translatable elements shown as rams 41, 42 and 43 support the tool holders, the first being movable in opposite directions horizontally, and the other two being movable in opposite directions vertically. Three secondary translatable elements 45, 46 and 47 support the primary elements, the first being movable vertically, and the other two being movable horizontally.

In somewhat more detail, the first translatable element 41 is a ram feedable horizontally within the element or saddle 45, the latter riding along vertical ways 50 on the base 31 as it is fed vertically. The power for these feeding motions is taken through multiple ratio feed gearing contained within a first head 51 having on its face appropriate control instrumentalities which will be more fully described. The translatable element 42 is formed as a ram slidable vertically within the element 46 formed as a saddle movable horizontally along ways 54, 55 machined on a cross rail 56. Power for the feeding movements of the ram 42 and the saddle 46 is supplied through a multiple ratio feed transmission contained within a second head 58 supported at the left side of the cross rail 56.

The tool holder 40 may be one of a plurality supported in a selectively rotatable turret 60 carried by the translatable element 43. The latter is formed as a ram slidable vertically in the element or saddle 47. This saddle is feedable horizontally back and forth along the ways 54, 55 of the cross rail 56. Such feeding motions are controlled and given different directions and rates by a feed transmission contained within a third head 62 mounted at the right end of the cross rail 56.

To supplement the range of vertical movement of the tool holders 39 and 40 afforded by the rams 42 and 43, the cross rail 56 is itself vertically translatable along ways formed on the upstanding base.

Each of the heads 51, 58 and 62 includes exposed control instrumentalities such as hand wheels 64 for permitting manual positioning of the corresponding slide and ram, a first scale and micro-dial 65 which rotates in proportion to vertical movement of the corresponding tool holder and thus indicates its position, and a second scale and micro-dial 66 which rotates in proportion to the horizontal movement of the corresponding tool holder and thus indicates its horizontal position. A simple feed rate selector 68 is also supported by each head, permitting an operator to change feed rates by a simple finger-tip manipulation. The direction of feeding movement for each of the tool holders is controlled by a swivel direction selector assembly 69. Up and down movement of the cross rail 56 is under the control of the hand lever 70.

Besides accurately controlled feeding movements for the several rams and slides, the lathe 30 is also equipped to traverse these elements at relatively rapid rates. The feed and traverse drives for the several translatable elements are best understood with reference to diagrammatic Fig. 2. Power for feeding all of the elements is taken from a gear 75 near the output of the multi-speed table drive transmission 76 (shown in block form only) so that any feed movement is proportional to table rotation and is expressed numerically in inches per table revolution. The table speed transmission 76 works into a speed change gear set 78 which permits selection of "high" and "low" speed ranges by the positioning of a manual lever 79. The lever 79 is suitably linked to shift a large reaction member or internal ring gear 80 for the planetary gearing 78. This gearing also includes a sun gear 81 fast on the output shaft of the transmission 76 and surrounding by a plurality of planet gears 82 which are journaled on studs 84 supported by a planet carrier 85. The several planet gears mesh at their outer peripheries with the ring gear 80. The carrier 85 drives a bevel gear 86 which meshes with a ring gear 88 on the underside of the table 32 to drive the latter. Shifting the ring gear 80 to the left so that it is clutched to teeth 89 on a clutch disc rigid with the transmission output shaft locks the planetary gearing and produces direct drive therethrough. Alternatively, when the ring gear 80 is shifted to the right so that it clutches with teeth 90 formed rigid with housing 31, the planet gears "work" and produce a speed reduction, say, in the order of 4:1.

With power for the various feed transmissions taken from the gear 75, it will be apparent that the feed rates for the several translatable elements also have "high" and "low" ranges, depending upon whether the ring gear 80 is shifted from one position to another.

From the gear 75, a gear 95 fast on a shaft 96 is driven, the latter driving through bevel gears 98, 99 a vertical splined shaft 100. Slidable along the splined shaft 100 are bevel gears 101, 102 which provide power to cooperating input gears 103, 104 for the heads 51 and 62. The splined shaft 100 thus permits continuous power input to the heads 51 and 62 even though they are moved vertically.

For transmitting feed power to an input gear 105 of the left head 58, bevel gears 108, 109 at the top of the splined shaft 100 drive a top cross shaft 110, which in turn drives a second vertical splined shaft 111 through bevel gears 112, 113. A bevel gear 114 slidable along the shaft 111 meshes with the input gear 105 to drive the latter.

With the power thus supplied to the head 51 through the gear 103, it is taken out through either a first output shaft 118, a second output shaft 119, or both. The first output shaft carries a bevel gear 120 which drives a nut 121 riding on a stationary vertical lead screw 122. This, then, produces vertical feed of the head 51 and the saddle 45 associated therewith. The second output shaft 119 carries a gear 124 which, acting through an idler 125 and third gear 126, drive a lead screw 128 engaged with a nut 129 fast on the ram 41. Rotation of the lead screw 128 in opposite directions thus moves the ram 41 back and forth.

With input power supplied to the right head 62 through the bevel gear 104, ouput is taken through either a horizontal splined shaft 130, a horizontal lead screw 131, or both, the latter being suitably journaled on the cross rail 56. The splined shaft 130 carries an axially slidable bevel gear 132 mating with a gear 134 which drives through another set of bevel gears a vertical lead screw 135 journaled in the saddle 47. The lead screw 135 is engaged with a nut 136 fast on the ram 43 so that the latter is moved up and down as the splined shaft 130 is rotated in opposite directions. Since the gear 132 is free to slide axially of the splined shaft 130, this vertical feeding of the ram 43 may take place regardless of the horizontal position of the saddle 47 relative to the rail 56.

The horizontal lead screw 131 is engaged with a nut 138 rigidly carried in the saddle 47 so that the latter is translated horizontally back and forth as the lead screw 131 is rotated in opposite directions.

The left head 58 similarly has two outputs, that is, a splined shaft 140, and a lead screw 141 both journaled on the rail 56. The splined shaft 140 carries an axially slidable bevel gear 142 mating with a gear 144 which drives, through another pair of bevel gears, a vertical lead screw 145. The latter engages with a nut 146 carried by the ram 42 to impart vertical feed movement to that ram. The saddle 46 is moved horizontally along the rail 56 by means of a nut 148 engaged with the lead screw 141.

For traversing the several translatable elements a separate traverse motor 150 is connected by belts 151 and appropriate gearing to a vertical splined shaft 152 which carries axially slidable bevel gears 154, 155. The latter mesh with traverse input gears 156, 157 for the respective heads 62 and 51, thus providing traverse power input to these heads regardless of their vertical positions. Power from the traverse motor 150 is supplied to a traverse input gear 160 for the head 58 through a gear 161 slidable axially along a vertical splined shaft 162. The latter is driven by bevel gears 164, 165 from a horizontal shaft 166 rotating in timed relation to the vertical splined shaft 152 by means of bevel gears 168, 169.

The cross rail 56 is fed vertically up or down by means of two rotatable lead screws 170, 171 driven by respective bevel gears 172, 173 on the layshaft 174. The latter is reversibly driven from the shaft 166 by means of complementally engageable clutches 176, 177 which selectively lock gears 178, 179 to the shaft 166. The gears 178, 179 drive respectively corresponding gears 180, 181 fast on the shaft 174, a reversing idler gear being interposed between the gears 178 and 180. The clutches 176 and 177 are complementally energized by shifting a yoke 182 to the left or to the right, this being accomplished by movement of the hand lever 70 which is suitably linked to the yoke.

Multiple ratio feed gearing

Because the feed transmissions in the heads 51, 58 and 62 are substantially identical, a description of the transmission in the right head 62 will suffice for all. With reference to Figs. 3 and 4, the feed transmission is shown interposed between the input bevel gear 104 and the two output members constituted by the splined shaft 130 and the saddle lead screw 131.

In accordance with one feature of the invention, the multiple ratio feed transmission is rendered particularly simple and compact by an arrangement which utilizes bi-directional overrun devices each controlled by a single clutch to produce either of two drive ratios. The term "bi-directional overrun device" is used to describe what might otherwise be called a bi-directional automatic clutch of the general type disclosed and claimed in applicant's copending U. S. application Serial No. 473,537 filed December 7, 1954. Such devices comprise three rotary members formed and interconnected by means to prevent relative rotation (other than a slight degree of freedom) and thus to transmit torque between the first and third members, but to permit rotation of the second member in either direction relative to the other two members when it tends to rotate faster or overrun them. However, the construction of the device is such that the second member is locked to the others and torque is transmitted between the second member and others when it tends to rotate more slowly than the others. This operation obtains for either direction of rotation.

While reference may be made to the copending application referred to just above, Fig. 5 illustrates the preferred construction of such an overrun device 185. As there shown, the device comprises a first member formed with a hexagonal head 185a, a second or overrunning member 185b and a third or driver member formed with a three-pronged head 185c. The hexagonal head 185a, the three-pronged driving head 185c and the overrunning member 185b are all disposed in concentric relation with the straight inner surface of the prongs lying opposite alternate ones of the six sides of the hexagonal head 185a. A plurality, in this instance three, of cylindrical rollers 185d are interposed between the opposed corners of the prongs, and disposed between alternate sides of the hexagonal head and the smooth inner cylindrical surface of the overrunning element 185b.

As fully explained in the above-mentioned copending application, Serial No. 473,537, the hexagonal head 185a and three-pronged head 185c are machined to have slight angular freedom (in the order of 6 degrees). The construction of the bi-directional overrun device 185 results in operation such that the first and third members 185a, 185c always rotate together, except for negligible take-up of the clearance therebetween as their directions of rotation or relative rotational speeds change. Torque cannot be transmitted directly between the second and third members, i. e., between the overrunning member 185b and the prong member 185c. Torque is transmitted between the first or hexagonal member 185a and the second or overrunning member 185b only when the rollers 185d wedge between the two. This occurs only if (a) the overrunning member tends to rotate more slowly than the hexagonal member when input drive is supplied to the latter, or (b) the overrunning member tends to rotate faster than the hexagonal member when input drive is supplied to the former. If in the first case (a), the overrunning member is made to overspeed the hexagonal member, then the rollers unlock and the overrunning member spins freely. If in the second case (b), the hexagonal member is driven by the prong member faster than the overrunning member, then the prongs unlock the roller and the overrunning member may then spin freely.

In carrying out the invention, one or more of the bi-directional overrun devices are connected in tandem between the power source and a translatable machine tool element, each device being associated with permanently meshed gearing and a clutch for causing drive either through or exclusively of the overrunning member by causing it to tend to run faster or slower than the hexagonal and prong members according to whether the clutch is engaged or disengaged. For this purpose, a first gear is made integral or fast with the overrunning member, and a second gear is disengageably connected by the clutch to the prong member. A gear couplet has two gear portions thereof meshed respectively with the first and second gears, and made of relative diameter such that with the clutch engaged the overrunning member rotates faster or slower than the hexagonal member and prong members, thus spinning freely if input torque is supplied to the hexagonal member or the prong member, respectively. There is thus drive either through or exclusively of the overrunning member, each giving a different speed change ratio depending upon engagement or disengagement of the single clutch.

With more specific reference to Figs. 3 and 4, three bi-directional overrun devices 185, 187 and 189 are employed in the feed transmission in order to provide a total of eight possible feed rates for a given input speed of the bevel gear 104. The first bi-directional overrun device has its hexagonal member 185a formed integrally on a shaft 190 to which the input bevel gear 104 is splined. The cooperating prong member 185c is made with a sleeve portion which is journaled on the shaft 190, while the external surface of the overrunning member 185b has an integral gear 191 formed thereon. Mounted stationary and journaled on the sleeve portion of the prong member 185c is the electro-magnetic coil 192a of an electric clutch 192 which includes friction discs 192b, 192c biased apart and brought together when the coil is energized. The discs 192b are splined to a support member keyed to the sleeve portion and are thus rotationally rigid with the sleeve portion of the prong member 185c. The alternate discs 192c are splined in an axial sleeve projecting from a gear body 192d journaled on the shaft 190 and having integral, external gear teeth 194. Energization of the coil 192a thus locks the gear 194 to the prong member 185c, while release of the clutch permits these parts to rotate relative to one another and to the shaft 190.

To make the overrunning member 185b rotate faster than the hexagonal member 185a and the prong member 185c whenever the clutch 192 is engaged, gear means comprising a couplet 196 are supported on a suitably journaled shaft 198. The couplet includes a right gear portion 196a which meshes with the gear 194, and a left gear portion 196b meshing with the gear 191, the two being connected integrally by a sleeve portion 196c, With the clutch 192 disengaged, therefore, the prong member 185c is rotationally free, while the overrunning member 185b tends to lag or rotate more slowly than the hexagonal member 185a driven by the gear 104. As a result, the rollers 185d in the overrun device lock the hexagonal and overrunning members together, so that the gear 191 positively drives the gear 196b and the couplet 196. The relative diameters of the two gears 191, 196b may be chosen, for example, such that the couplet 196 turns about 25 percent slower than the hexagonal member 185a.

When the clutch 192 is engaged by energization of the coil 192a, thus locking the prong member 185c to the gear 194, the latter gear positively drives the gear 196a and the couplet 196. The ratio of these two gears may be chosen, for example, such that the couplet is driven about 25 percent faster than the hexagonal member 185a under these conditions. Thus, the change in the speed of the couplet as the clutch 182 is engaged or disengaged is in the ratio of about 2:1. During the time that the clutch 192 is engaged, rotation of the gear couplet 196 by drive from the gear 194 causes the gear 191 on the overrunning member 185b to be driven at a speed substantially in excess of the speed of the hexagonal member 185a. Thus, the overrunning member 185b simply turns freely and overruns without interference.

The second bi-directional overrun device 187 is connected in tandem with the first and provides two output speeds for each rotational speed of the gear couplets 196. In the present arrangement, the hexagonal member 187a is formed integrally with a shaft 200 which is suitably journaled in the head. The prong member 187c has a sleeve extending therefrom and journaled directly on the shaft 200. Keyed to that sleeve is a support member journaling a stationary clutch coil 201a of a second electro-magnetic clutch 201. This clutch includes friction discs 201b and 201c splined to the support member and an axial extension of a gear body 201d journaled on the shaft 200 and having integral external gear teeth 204. The overrunning member 187b has an external gear 205 formed thereon. The gears 204 and 205 mesh respectively with the gears 196b and 196a of the couplet 196 which thus serves as an input member for the second bi-directional clutch arrangement. The gear couplet 196 thus serves to simultaneously drive the gears 204 and 205 at different speeds, the gear 204 faster than the gear 205. By way of example, the relative diameters of the gears 196a and 205 may be such that the latter is driven at slightly less than one-half the speed of the couplet 196 while the relative diameters of the gears 196b and 204 may be such that the latter is driven at slightly less than 50 percent faster than the couplet 196.

Now with the clutch coil 201a energized and the clutch 201 engaged, the prong member 187c is rigidly connected to the gear 204 and positively driven at a speed greater than the overrunning member 187b. Accordingly, the prong member 187c positively drives the hexagonal member 187a while causing the rollers 187d to be unlocked and permitting the overrunning member to spin freely. This provides, then, a first and relatively fast output speed for the hexagonal member 187a. Alternatively, when the clutch 201 is disengaged, then the prong member 187c is not driven at all and the overrunning member 187b is positively driven at a slower speed from the gear 196a. Under these conditions, the rollers 187d are wedged between the overrunning member and the hexagonal member, causing the former to drive the latter at a second and relatively slow speed. The ratio between these two possible output speeds of the hexagonal member 187a may be, for example, in the order of 1.4:1.

The third bi-directional overrun device 189 is connected in tandem with the second by means of a gear 208 keyed directly to the shaft 200 and having an integral extension splined to friction discs 209c of a third electro-magnetic clutch 209. This clutch has friction discs 209b which are splined to a support member keyed to an integral sleeve portion of the prong member 189c journaled on the left end of the shaft 200. A stationary clutch coil 209a concentrically surrounds and is journaled on the support member, the clutch being constructed such that upon energization of the coil the discs 209b, 209c are frictionally locked. The hexagonal member 189a is rigid with a splined shaft 210 extending to the left (Fig. 4), while the overrunning member 189b is formed with an external gear 211.

For driving the gear 211 and the overrunning member 189b at a speed different from the speed of the input gear 208, a gear couplet 214 is employed, having a sleeve portion 214a journaled on a shaft 215 and presenting gears 214b, 214c which mesh respectively with the gears 208 and 211. The relative diameters of the gears 214b, 208 and 214c, 211 may be chosen, for example, such that the gear 211 rotates at a speed sixteen times more slowly than the input gear 208.

When the clutch 209 is engaged, the prong member 189c is positively driven directly from the input gear 208 at a speed considerably faster than the rotational speed of the gear 211 and overrunning member 189b. Accordingly, the rollers 189d are released and direct drive from the gear 208 to the hexagonal member 189a is produced, resulting in a relatively high output speed for the shaft 210. On the other hand, when the clutch coil 209a is deenergized, and the clutch disengaged, the prong member 189c is rotationally free relative to the input gear 208. Accordingly, the overrunning member 189b is positively driven by the couplet 214 causing the rollers 189d to lock it to the hexagonal member 189a so that the latter is driven at a relatively low speed. It will therefore be seen that energizing and deenergizing the clutch coils 192a, 201a and 209a in various combinations, a total of eight possible speeds may be given to the shaft 210 if the speed of the input gear 208 remains constant.

To provide a fourth stage of speed ratio change, and to permit interrupting of the feed transmission, two complementally engaged clutches are employed. As shown in Figs. 3 and 4, the shaft 210 has locked thereon a bearing sleeve 218 which journals a freely rotatable gear 219. The latter is formed with an extension receiving splined friction discs 219a adapted to be drawn against mating friction discs 220b splined to a support member rigid with the shaft 210 upon energization of a clutch coil 220a for an electro-magnetic clutch 220. The clutch coil is held stationary and journaled in surrounding relation to the support member. At its left side, another gear 224 is rigidly splined to the shaft 210. Disposed on the shaft 215 immediately below the shaft 210 are gears 225 and 226 which mesh respectively with the gears 224 and 219. The gear 225 is freely journaled on the shaft 215 by a suitable sleeve bearing 228, while the gear 226 is rigidly keyed to the shaft. The gear 225 may be selectively locked to the shaft 215 by means of an electric clutch 229. For this purpose, the clutch includes a stationary coil 229a journaled on a support member keyed to the shaft and splined to friction discs 229b engageable with mating friction discs 229c splined to an extension of the gear 225.

It will thus be seen that with the clutch 220 engaged and the clutch 229 released, drive is taken from the shaft 210 through the gears 219 and 226 to the shaft 215, the gear 225 turning freely relative to that latter shaft. Alternatively, with the clutch 220 disengaged and the clutch 229 engaged, drive is taken from the shaft 210 through the gears 224 and 225 to the shaft 215, the gear 219 turning freely relative to the shaft 210. This may produce any desired speed change of the shaft 215 relative to the shaft 210. Merely by way of example, the gears 219, 226 and 224, 225 are made of such relative diameters that the speed of the shaft 215 is four times higher when the clutch 220 is engaged than when the clutch 229 is engaged. With both clutches 220 and 229 released, the shaft 215 is not driven from the shaft 210.

The over-all arrangement of speed change means thus permits the shaft 215 to be driven at any one of sixteen possible speeds for a given speed of the input gear 104, depending upon the combined energization or deenergization of the five electro-magnetic clutches 192, 201, 209, 220 and 229. And since the input gear 104 may rotate in a "high" or "low" range relative to the table 32 depending upon the setting of the gear means 78 (Fig. 2), a total of thirty-two relative speeds of the shaft 215, i. e. revolutions per table revolution, are possible. And because the overrun devices 185, 187 and 189 are bidirectional, i. e., work equally well when the input drive thereto is in one direction or the other, the entire transmission here described may have a reversible input. For example, the feed take-off gear 75 (Fig. 2) which is on the output shaft of the transmission 76 which drives the table 32 may rotate in either direction if it is desired to drive the table in opposite directions. Yet, the feed transmissions here described work in the same way.

For transmitting this multiple ratio drive to the two translatable elements, i. e., the saddle 47 and ram 43, drive is taken from the gear 226 to a gear 230 journaled on a sleeve bearing 231 supported by a shaft 232. The gear 230 is formed with slip clutch teeth 230a engaged with corresponding teeth on a clutch element 234 splined or keyed to the shaft 232. This prevents damage to the gear train in the event that one of the translatable elements should encounter an obstruction or reach the end of its range of movement before the feed is interrupted. Fast on the shaft 232 are a pair of spaced gears 238 and 239. The first of these meshes with a gear 240 which is freely journaled on a shaft 241 and releasably locked thereto by means of an electro-magnetic clutch 242 which is constructed in a manner similar to those clutches previously described. This clutch includes an electro-magnetic coil 242a.

As a means of providing reverse drive to the shaft 241, the gear 239 is meshed with an idler gear 244 which in turn meshes with a second gear 245 freely journaled on the shaft 241 and selectively locked thereto by means of an electric clutch 246 having a clutch coil 246a. Rigid on the shaft 241 is a bevel gear 248 which is thus rotated in one direction or the other depending upon whether the clutch 242 or the clutch 246 is engaged, and at any one of sixteen speeds, for a given speed of the input bevel gear 104, depending upon the combined energization of the previously described clutches. The bevel gear 248 meshes with a mating gear 249 (Fig. 3) which is fast on a shaft 250 carrying the indicating scale 65. Also fast on the shaft 250 is a spur gear 251 meshing with an additional gear 252 carried by a shaft 254. This shaft has at its opposite end a bevel gear 255 driving a mating bevel gear 256 carried fast at one end of the splined shaft 130. Thus, as explained above, rotation of the shaft 241 in opposite directions correspondingly rotates the splined shaft 130 in opposite directions and serves to raise or lower the ram 43 (Fig. 2). The clutch 242 may be designated as the "up" clutch since when it is engaged it causes the ram 43 to be fed upwardly; and, conversely, the clutch 246 may be designated as the "down" clutch.

Since the reversing clutches and gearing for the saddle 47 are constructed similarly to those previously described for the ram 43, they have not been illustrated in detail in Fig. 4, but illustrated only schematically in Fig. 3. As there shown, the gears 238 and 239 on the shaft 232 mesh also with gears 270, 271 respectively, the former being freely journaled on a shaft 272 and the latter being separately journaled as a reversing idler. The idler gear 271 meshes with an additional gear 274 which is also freely journaled on the shaft 272. The gears 270 and 274 are selectively locked to the shaft 272 by respective electric clutches 275 and 276 having electric coils 275a and 276a. The shaft 272 carries fast thereon a bevel gear 278 meshing with a mating gear 279 on a shaft 280. The latter shaft works into the indicator scale 66 and also carries a bevel gear 281 drivingly engaged with a corresponding gear 282 fast on one end of the saddle lead screw 131. The saddle 47 is thus fed to the left or to the right according to whether the clutch 275 or the clutch 276 is energized, the speed of its movement being determined by the combined energization of the first five speed changing clutches 192, 201, 209, 220, and 229. The clutch 275 may be designated as the "in" clutch and the clutch 276 may be termed the "out" clutch since when they are energized they cause the saddle 47 to move in or out relative to the work table 32.

For moving the ram 43 and the saddle 44 at rapid traverse rates, the gearing connection between the input bevel gear 104 and the shaft 232 is broken by deenergizing both the clutches 220 and 229, and power from the traverse motor 150 (Fig. 2) is supplied through the traverse input bevel gear 156. The latter is rigidly splined (Figs. 3 and 4) to a shaft 285 journaled in the head and freely journaling by suitable anti-friction bearings the reversing idler gear 244. The gear 244 may, however, be releasably locked to the shaft 285 by an electric clutch 286 having a coil 286a and otherwise constructed in a manner similar to those clutches previously described. With the clutch 286 engaged, the shaft 232 is driven from the traverse input gear 156 through the idler gear 244 and the meshing gear 239. With the two gears 238 and 239 thus rotating at a rapid rate, the ram may be traversed upwardly or downwardly by energizing either the clutch 242 or the clutch 246. Correspondingly, the saddle may be traversed inwardly or outwardly by energizing the clutch 275 or the clutch 276.

As mentioned previously, the hand wheel 64 may be turned manually to make fine adjustments in the positions of either the saddle 47 or the ram 43. To effect this, the hand wheel 64 is carried by a shaft 290 which is shiftable axially within the head. Fast on the inner end of the shaft 290 is a spur gear 291 which may thus be centrally positioned in "neutral" or engaged optionally with the gear 252 on the shaft 254 (Fig. 3) or an additional gear 292 journaled on the shaft 254. In the former case rotation of the hand wheel 64 results in corresponding rotation of the splined shaft 130 and thus raising or lowering of the ram 43. The ram position indicating scale 65 is also turned proportionally since the gear 252 meshes also with the gear 251. In the latter case, when the gear 291 is engaged with the gear 292, rotation of the hand wheel results in rotation of still another gear 294 fast on the shaft 280, so that both the lead screw 131 and the scale 66 are rotated to change the position of the saddle 47 and accurately indicate such position.

Of course, during the time that the hand wheel 64 and its shaft 290 are shifted from the "neutral" position, it is desirable to prevent positive feed drive which would cause rapid spinning of the hand wheel and possible injury to an operator. For this purpose, and as more fully described below, a pair of control switches 295 and 296 are supported on a mounting block 298 alongside the shaft 290 (Fig. 7). Upstanding arms 229, 300 pivoted on a shaft 305 carry adjustable screws 301, 302, respectively, which depress the yieldable actuators 295a and 296a of the two respective switches under the influence of a tension spring 304 which draws the arms toward one another. Made fast to the shaft 305 is an arm 306 which carries a stud 308 projecting into an annular groove formed in the shaft 290. A yoke 307 is clamped to the shaft 305 between the arms 299, 300.

Outward or inward movement of the shaft 290 thus rocks the arm 306, the shaft 305, and the yoke 307 to the right or left (Fig. 7) and causes the latter to engage and shift either the arm 300 or the arm 299 outwardly from the corresponding actuator 296a or 295a. Release of the actuators changes the condition of the contacts within the switches 295 and 296. The switches 295 and 296 may be of miniature, pressure sensitive type available commerciallly, for example, under the trade names "Micro-Switch" or "Switchette." The result of actuation of either of the switches in response to shifting of the shaft from its "neutral" position will be described more fully hereinafter.

In a feed transmission having a relatively large number of gears, such as here described, it is most important that lubrication be reliably supplied to the sliding way surfaces and lead screw nuts of the movable elements while movement is actually in progress. On the other hand, needless pumping of lubricant over stationary parts merely taxes the lubricant sump, results in unnecessary heating of oil, and consumes power. In the present instance, two solenoid valves 310 and 311 (Fig. 7) are disposed within the head 62, each being connected by appropriate conduits 312 to supply lubricant to the way surfaces and lead screw nuts associated with the ram 43 and the saddle 47, respectively. Since these valves are opened and closed by energization and deenergization of electric solenoid windings, they may be controlled by switches, in the particular manner to be described in detail below, so that the way surfaces and lead screw nuts of the ram and saddle are supplied with lubricant only when movement of those particular elements is taking place.

Feed rate selector

As previously indicated, the feed rate for the ram 43 or the saddle 47 (or both if they are moved simultaneously) may have any one of sixteen possible values according to the combined energization pattern of the electric clutches 192, 201, 209, 220 and 229. In order to permit such selection of any particular feed rate with maximum convenience and only finger-tip manipulation on the part of an operator, the permutation selector switch assembly 68 is employed as best illustrated by Figs. 6 and 12 through 18. This permutation switch assembly may be constructed as disclosed and claimed in applicant's copending application Serial No. 525,469 filed August 1, 1955. However, it comprises, briefly, a frame made up of front and rear apertured plates 320, 321 which are held together by a plurality of fasteners 322 (Figs. 12-15). A shaft 324 is extended through the frame plates and rotatably journaled therein, having a square cross-sectional portion 324a disposed between the two plates. A suitable face plate 325 may be fixed to the frame plate 320 and marked with numerical indicia (Fig. 6) indicating the feed rates for the ram 43 and saddle 47 according to the rotational position of an index mark on a hand knob 326. The latter is locked by a set screw 328 on the shaft 324 and used to rotationally adjust the latter.

A plurality of switches S1, S2, S3 and S4 are disposed between the plates 320, 321 in angularly spaced relation about the shaft 324. The fasteners 322 which hold the plates together may be passed directly through mounting holes in the switch bodies, the latter thus serving to space the plates apart. The several switches, therefore, are disposed in substantially the same plane and present their respective yieldable actuators S1a, S2a, S3a and S4a in angularly spaced relation about the shaft and extending radially inward toward the latter. Each of the switches contains normally open and normally closed contacts which are reversed when their respective actuators are depressed, as explained more fully below.

To produce every possible combination of switch actuation, a plurality of cams C1, C2, C3, and C4 are mounted in axially spaced relation on the square portion 324a of the shaft 324. These cams have center apertures 330 matching the cross section of the shaft portion 324a so that they must rotate with the latter. It will be observed from Figs. 15-18 that the cam C1 is formed with two radial transition points 331, 332 between relatively large and small radius peripheral portions, these transition points being spaced 180° apart. The second cam C2 has four such radial transition points 334–337 between four peripheral portions, two of which are of relatively large radius and two of which are of relatively small radius, all subtending approximately 90°. The third cam C3 has eight radial transition points 338 joining eight peripheral portions of alternately large and small radius. Finally, the cam C4 has sixteen radial transition points 339 spaced apart 22½° and separating sixteen peripheral portions of alternately large and small radius. The cams are "phased" on the shaft portion 224a so that a large radius portion of each lies at the same angle.

For operatively associating each of the cams with a corresponding one of the switches, a plurality of trip plates 340, 341, 342, 343 are pivotally mounted on a corresponding plurality of collared screws 344 which may also serve to mount a fifth switch O for a purpose explained below. Each of the trip plates extends from its pivot mounting to overlie a corresponding one of the switch actuators S1a–S4a, the plates being substantially equal in axial length to the space taken by the several cams C1–C4. To make each trip plate responsive only to a corresponding one of the cams, the plates are each divided with an inturned follower tab 340a—343a, respectively. These follower tabs are progressively spaced axially along the shaft (compare Figs. 15–18) so that the tab 340a rides on the cam C1 and causes the trip plate 340 to actuate the switch S1, the tab 342a rides along the cam C2 and causes the trip plate 342 to actuate the switch S2, the tab 341a rides along the cam C3 and causes the trip plate 341 to actuate the switch S3, and the tab 343a rides on the cam C4 causing the trip plate 342 to actuate the switch S4.

The face plate 325 carries indicia at sixteen angularly spaced positions (Fig. 6). To hold the shaft 324 and the several cams at any one of these positions, after they have been set by manually adjusting the knob 326, the cams C1–C4 are provided with small axial holes 345 which alined after the cams are assembled on the shaft. A compression spring 346 disposed within the passageway formed by these alined holes (Fig. 13) urges a pair of detent balls 348 outwardly into yieldable engagement with corresponding ones of a plurality of sixteen angularly spaced detent holes 349 drilled in the front and rear frame plates 320, 321.

To afford utmost convenience for overriding automatic trip controls, as described below, the shaft 324 is made hollow with a central passageway 324b therethrough. A plunger 352 is axially slidable in the passageway 342b as a push button 354 in the center of the knob 324 is depressed. The plunger 352 is operatively connected to depress the actuator Oa of the fifth miniature switch O mounted by a suitable bracket (not shown) to the rear face of the frame plate 321. The switch O, when actuated, results in resumption of feed movement when such movement has been automatically terminated by positioning means to be more fully described.

From the foregoing, it will be seen that the switch S4 is actuated or deactuated each time that the knob 326 and the shaft 324 are indexed from one position to the next. That is, the switch S4 is actuated in the eight alternate positions of the sixteen possible positions for the knob 326. Since the cam C3 has eight radial transition points 338 and correspondingly only four alternate peripheral portions of relatively great radius, the switch S3 is actuated or deactuated each time the shaft 324 is indexed through two successive rotational positions. That is, the switch S3 is actuated when the shaft is in every other pair of its sixteen successive angular positions. Similarly, because the cam C2 has only two peripheral portions of relatively great radius, the switch S2 is actuated when the shaft is in alternate groups of four adjacent positions out of the possible sixteen positions. Finally, the switch S1 is actuated when the shaft 324 is in eight successive ones of the sixteen possible positions.

Referring to Fig. 26, the four switches S1–S4 are diagrammatically represented to indicate that each has a pair of normally open contacts designated by the additional suffix "1" and a pair of normally closed contacts designated by the suffix "2." Taking the switch S1 as an example, the contacts S1–1 will be closed and the contacts S1–2 will be open when that particular switch is actuated. The normally closed contacts S1–1 through S4–1 are not employed in the control circuit described hereafter, but they have been shown in Fig. 26 simply because double contact switches are the most common commercial type. The contacts S1–2 through S4–2 do perform important functions to be described; it will be understood that the switches S1–S4 may, therefore, each have but a single set of contacts. In a similar manner, the fifth switch O has two sets of normally open contacts O–1 and O–2 which are closed when that particular switch is actuated.

Direction selector assembly

In accordance with one aspect of the invention, the direction in which the tool holder 40 and turret 60 are fed is controlled by finger-tip deflection of a swivel lever in the desired direction of movement. The tool holder 40 may be moved up or down by feed of the ram 43 alone; it may be moved horizontally in or out by feed of the saddle 47 alone; and it may be moved diagonally up and in, up and out, down and in, or down and out by simultaneous feed of the saddle 47 and ram 43. Eight directions of feed movement are thus possible by energizing the direction-determining clutches 242, 246 and 275, 276 singly and in different groups of two, the rate of movement of the tool holder being determined by the combined energization of the speed-changing clutches 192, 201, 209, 220 and 229.

For direction control, an extremely compact swivel lever switch assembly 69 (Figs. 1 and 7) is provided, having four small switches which are actuated singly or in four groups of two in response to deflection of a swivel lever in eight respective directions from a central position. The construction of this direction selector switch assembly is such that the lever is firmly but yieldably held in its central position, lightly retained in any of the eight directions it might be moved, and returned to its central position with but a slight tap.

Referring in more detail to Figs. 19–24, the direction control assembly 69 comprises a frame 365 having a central passage 366 therethrough and a medial, radially extending flange 368 (Fig. 20). Four miniature switches U, D, I and OT of the miniature, pressure sensitive type are mounted between the flange 368 and a centrally apertured retaining plate 369. A plurality of screws 370 are passed directly through the plate, the switch bodies, and into tapped openings in the flange. The switches are spaced angularly about the axis of the passage 366 with their respective actuators Ua, Da, Ia, and OTa projecting radially inward.

For swivelably receiving the spherical end 372a of a hand lever 372, the passage 366 is machined with a curved shoulder or surface 366a. After the spherical end 372a has been brought into engagement with the curved seat 366a, a beveled retaining ring 374 is placed in the passage 366 to provide for universal, swiveling movement of the lever.

For actuating the four switches U, D, I and OT singly and in four groups of two, an annular wobble plate 375 is telescoped over the hand lever 372 and slidably disposed between the plate 369 and the outer end of the frame 365. The wobble plate 375 is adapted at its periphery to engage and depress each of the yieldable actuators Ua, Da, Ia and OTa when shifted toward them. It will be apparent from Fig. 23 that movement of the wobble plate directly up or down from its central position depresses the respective actuators Ua and Da; while movement horizontally to the left or right depresses the actuators Ia or OTa. Further, movement of the wobble plate diagonally upward to the right will simultaneously depress the actuators Ua and OTa; while movement diagonally downward to the left will simultaneously depress the actuators Da and Ia. Correspondingly, movement of the wobble plate diagonally upward to the left will simultaneously depress the actuators Ia and Ua; while movement of the wobble plate diagonally downward to the right simultaneously depresses the actuators Da and OTa. With this arrangement, therefore, movement of the hand lever 372 in eight directions from its central position actuates the four switches singly or in pairs.

In order to yieldably retain the wobble plate 375 in its central position and to yieldably retain it with less stability in each of its eight displaced positions, yieldable detent means are provided which cooperate with specially machined surfaces on the inner face of the plate. As shown best in Fig. 20, the inner face of the wobble plate 370 is machined with an annular, V-shaped groove 375a spaced slightly inwardly from a flat border surface or shoulder 375b. Tapering radially inward from the innermost rim of the V-shaped groove 375 is a bevel surface 375c. But four detents are required. As here illustrated, the frame 365a is formed with four axial holes 376 spaced at 90° intervals about the axis of the passage 366 and receiving detent balls 378 urged outwardly by compression springs 379. These balls are thus urged into the V-shaped groove 375a to yieldably restrain the wobble plate 375 in its central position (Fig. 20). All four balls 378 contribute to this retaining action. However, when the hand lever 372 is deflected upwardly, the lower ball is forced to abut the peripheral shoulder 375b (Figs. 22 and 25), while the upper ball 378 is urged against the beveled surface 375c. The lower ball thus gives no retaining action, while the upper ball 378 retains the wobble plate in the deflected position shown. Since only one detent ball is active to retain the wobble plate in its upwardly deflected position, only a slight force or tap is necessary on the lever to cause it and the wobble plate to snap back into the central position.

When the lever is deflected diagonally from its central position as illustrated in Fig. 24, where the wobble plate is shown deflected diagonally downward to the left, the two detent balls 378 from which the wobble plate retreats bear against the flat surface 375b and exert no retaining force. The two balls 378 toward which the wobble plate is moved, however, ride against the beveled surface 375c to yieldably retain the wobble plate in its deflected position. Nevertheless, because only two of the detent balls are active at this time, only a slight force or tap is necessary on the lever to make it and the wobble plate snap back into a central position. A result of this very simple construction, therefore, is that a relatively great force is necessary to the lever to move it from its central or "neutral" position, and that it is retained in any of the eight deflected positions but with such relatively small force that it is recentered simply in response to a light tap or force on the hand lever 372.

Also conveniently associated with the direction control assembly 70 are the traverse control means. The lever 372 has a central bore 372b slidably receiving a rod 380 terminating in a push button 381 disposed in the center of a hand knob 382 on the free end of the lever. A fifth miniature switch T having a yieldable actuator Ta (Fig. 21) is mounted on the back of the flange 368, the actuator projecting rearwardly. The actuator is held normally depressed by a flat arm 384 offset at 384a and fulcrumed on a sharp corner 385 of the frame 365. One end of the arm 384 bears against the actuator Ta and holds it depressed under the influence of a compression spring 386 surrounding a pin 388 fixed to the flange 368 and receiving the apertured opposite end of the arm 384. Simply by depressing the push button 381, therefore, the rod 380 pivots the arm 384 clockwise (Fig. 21) about the fulcrum point 385 against the bias of the spring 386, thus retracting the arm from the actuator Ta and letting the same snap outwardly to change the condition of internal contacts of the switch T. This switch T, controlled by depressing the push button 381 in the center of the hand knob 382 is used, as explained in detail hereinafter, to control traversing of the ram 43 and saddle 47.

Fig. 27 is a digrammaic representation of the contacts within the switches of the direction selector assembly 69. As there shown, each of the five switches U, D, I, OT and T, is of conventional construction, such as being available commercially for example under trade names such as "Micro-Switch" and "Switchette." Each of the switches contains one normally open and one normally closed pair of contacts which are designated by the reference character of the switch itself to which the suffixes 1 and 2 have been added. For example, the switch D contains normally open contacts D–1 and normally closed contacts D–2.

*Automatic feed termination or positioning*

The present feed transmission and its controls permit automatic termination of feed of the ram 43 and saddle 47 as they reach predetermined, adjustable positions. In keeping with this feature of the invention, means are provided, not on the translatable element itself, but on the indicator scale which moves in proportion to that translatable element, such means being adapted to actuate trip controls to stop the feed of that element when the scale reaches a predetermined, selectable position indicative of a predetermined position of the feedable element. An important advantage of this arrangement is that the adjustable means for predetermining the positions at which the element automatically stops are located remote from the element itself and at the operator's station where he can conveniently make adjustments. Moreover, since the adjustable means are associated with a position-indicating scale, adjustments to provide stopping at a desired position can be made by reading the scale and without a cut-and-try process.

Considering first such automatic positioning of the saddle 47, it will be observed from Figs. 2 and 7 that the scale 66 rotates in timed relation to horizontal movement of the saddle 47. As shown best in Fig. 8, the indicator scale 66 comprises an outer, annular scale member 400 concentric with and rotatable about a stationary index ring 401 which, in turn, surrounds a rotatable micro-dial 402 which rotates in faster, timed relation to the scale member 400. The scale member and the micro-dial are scribed with indicia read opposite an index mark on the index ring to indicate accurately the position of the saddle 47. The gearing connections between the shaft 280 and the scale member and micro-dial may be substantially as disclosed and claimed in applicant's copending application Serial No. 446,195, filed July 28, 1954.

Since it is important here only to understand that the scale member 400 rotates through approximately one revolution as the saddle 47 moves through its complete feed range, the details of the scale and micro-dial mechanism will not be described. However, for providing the automatic feed termination and positioning, as indicated above, the scale member 400 is machined with an annular recess 400a (Fig. 8) which receives a plurality of members which are relatively thin as compared to the axial length of the scale 400 or recess 400a. Such members are here shown as relatively rotatable trip rings 405 interleaved between a corresponding plurality of spacer rings 406. The spacer rings have a series of circularly spaced holes therethrough which receive a corresponding plurality of mounting pins 408 pressed into the scale member 400, while the trip rings 405 are made of proper internal diameter such that they rotatably surround the pins. A set screw 410 may be employed to clamp or lock the rings 405, 406 together after the trip rings have been rotationally adjusted relative to the scale 44, so that the trip rings then rotate with the scale.

As shown best in Fig. 9, each of the trip rings 405 is provided with a portion of abruptly changing radius as referred to the scale axis, here shown as a radial projection or dog 405a.

According to one feature of this invention, the same hand tool is conveniently employed to loosen or tighten the clamping means shown as a set screw 410, and to rotate or position the trip rings 405 relative to the scale member 400. In the present instance, the set screw 410 is an Allen screw which may receive a small Allen wrench 412 (Fig. 8). With the screw 410 loosened to unclamp the trip rings 405, the same Allen wrench may be inserted into any one of a plurality of radial notches 405b (Fig. 9) cut into the periphery of the rings 405. With the Allen wrench thus inserted, the trip ring 405 may be rotated relative to the scale member 400 until the projection 405a has the proper relative angular position to cause tripping or feed stoppage at the desired instant. The same Allen wrench may then be employed to retighten the set screw 410 and clamp the several trip rings 405 rotationally rigid to the scale member 400.

For cooperating with the radially projecting dogs 405a, a follower cylinder 420 is disposed in the paths of the dogs. The cylinder 420 is of sufficient axial length to be engaged by all of the dogs 405, and is carried on the free end of an arm 421 which is rigid with a shaft 422 suitably journaled in the head 62. The shaft 422 projects through the front face of the head 62 to the interior thereof, where it receives a yoke 424 rigidly locked by a screw 425. Supported on a mounting block 426 within the head is a saddle positioning switch SP of the miniature type previously described and having a yieldable actuator SPa. Two swingable plates 428, 429 are disposed on opposite sides of the mounting block 426 and rotatably supported from the shaft 422 by respective apertured ears 428a and 429a pivotally received on the shaft. The two plates 428, 429 are urged toward one another and into abutting relation with the edges of the mounting block 426 by a tension spring 430, the plate 428 carrying an adjustable projection or screw 431 which is set to hold the actuator SPa normally depressed.

As the scale member 400 rotates and carries one of the projections 405a past the cylinder 420, the latter is deflected away from the scale member so that the shaft 422 and arm 421 are rocked counterclockwise as viewed in Fig. 11. With this, the yoke 424 pushes against the arm 428 and forces the latter outwardly from the mounting block 426 so that the screw 431 releases the yieldable actuator SPa and changes the condition of the contacts contained within the switch SP. This actuation of the switch SP, as explained below, results in termination of feed movement for the saddle 47. It will be apparent that with five trip rings 405 mounted on the scale member 400, the feed movement of the saddle may be interrupted at five predetermined locations throughout its range of travel simply by adjustably phasing the trip rings 405 and the projections 405a relative to the scale member. Of course, if it is not desired to interrupt the feed and stop the saddle at any point whatever, the trip rings 405 are angularly adjusted relative to the scale such that the dogs 405a do not engage the follower cylinder 420.

It will be observed from Fig. 7 that a ram positioning switch RP is similarly mounted and controlled by trip rings disposed on the scale member 440 of the indicator scale 65, the switch being actuated in response to deflection of an arm 441 to effect automatic feed termination and positioning of the ram 43.

Control circuit and operation

As shown in Fig. 28, the electrical control circuit for providing various feed rates, various directions of feed and automatic termination of feed or positioning is quite simple. Connected between supply lines L1, L2 adapted for connection to a suitable voltage source are the normally open traverse contacts T-1 in series with the traverse clutch coil 286a. The normally closed traverse contacts of the traverse switch T are connected in series with the parallel combination of the clutch coils 220a, 229a, and 209a, each connected in series respectively with controlling contacts S2-2, S2-1, and S1-2. The clutch coils 201a and 192a are connected directly across the lines L1, L2 in series with their respective controlling contacts S4-2 and S3-2. By rotating the feed selector knob 326, the contacts S1-2, S2-2, and S3-2 and S4-2 are actuated in permutated combinations, as explained above, to energize the clutch coils 192A, 201a, 209a, 220a (and 229a) in various patterns, thus producing a total of sixteen speed change ratios through the bi-directional overrun devices 185, 187, 189 and the alternately operative gears 219, 226 and 224, 225 (Fig. 4). The switch contacts S2-1 are actuated complementally with the switch contacts S2-2, one set being closed when the other is open, so that a positive drive is obtained.

To clearly understand the actuation of the feed rate selector switches and the clutches, reference may be had to the following chart showing the sixteen possible conditions to produce sixteen feed rates:

| Angular Position of Feed Selector Knob 326 | Selector Switch Condition: 0=normal; X=actuated | | | | Clutch Condition: 0=deenergized; X=energized | | | | | Exemplary Feed Rate in inches per table revolution | |
|---|---|---|---|---|---|---|---|---|---|---|---|
| | S4 | S3 | S2 | S1 | 201 | 192 | 220 | 229 | 209 | "High" Feed Range | "Low" Feed Range |
| 1 | X | X | X | X | X | X | X | O | X | .576 | .144 |
| 2 | O | X | X | X | O | X | X | O | X | .384 | .096 |
| 3 | X | O | X | X | X | O | X | O | X | .288 | .072 |
| 4 | O | O | X | X | O | O | X | O | X | .192 | .048 |
| 5 | X | X | O | X | X | X | O | X | X | .144 | .036 |
| 6 | O | X | O | X | O | X | O | X | X | .096 | .024 |
| 7 | X | O | O | X | X | O | O | X | X | .072 | .018 |
| 8 | O | O | O | X | O | O | O | X | X | .048 | .012 |
| 9 | X | X | X | O | X | X | X | O | O | .036 | .009 |
| 10 | O | X | X | O | O | X | X | O | O | .024 | .006 |
| 11 | X | O | X | O | X | O | X | O | O | .018 | .004 |
| 12 | O | O | X | O | O | O | X | O | O | .012 | .003 |
| 13 | X | X | O | O | X | X | O | X | O | .009 | .002 |
| 14 | O | X | O | O | O | X | O | X | O | .006 | .0015 |
| 15 | X | O | O | O | X | O | O | X | O | .004 | .0011 |
| 16 | O | O | O | O | O | O | O | X | O | .003 | .0007 |

It will be observed that when the traverse switch T is actuated the normally closed contacts T-2 open to prevent energization of both the clutch coils 220a and 229a. This prevents transmission of feed power to the shaft 215 (Fig. 3) and permits the shaft 232 to be driven independently from the traverse motor 150.

For controlling the direction of feed movement of the tool holder 40, the direction controlling clutches 246a, 242a and 275a, 276a are energized singly and in four groups of two according to the position of the swivel lever 272 and the combined energization of the switches U, D, I, and OT. As shown in Fig. 28, the clutch 246a (which when energized causes the ram 43 to move downwardly) is connected across the lines L1, L2 through normally closed contacts U-2 and the series parallel combination of contacts U-1 and D-1. The ram positioning switch contacts RP-2 are also connected in series with these contacts, being paralleled by normally opened override contacts O-1, the whole circuit being connected in series with normally closed contacts of the switch 295 which is actuated when the hand wheel 64 is shifted inwardly to permit manual adjustment of the ram position. It will further be observed that the solenoid 310 for the valve controlling lubricant supply to the ram feed gearing is connected directly in series across the lines L1, L2 with the two parallel normally open contacts U-1 and E-1. To indicate when feed movement has been automatically terminated, a pilot lamp 500 is connected across the lines L1, L2, in series with a current limiting resistor 501 and the normally open contacts RP-1 of the ram positioning switch RP.

The operation of the circuit is thus as follows. If the hand lever 372 is displaced upwardly from its centered position, the switch U is actuated to open the normally closed contacts U-2 and to close the normally open contacts U-1. As a result, the "up" clutch 242a is disconnected by the contacts U-2, while the downward movement clutch coil 242a is energized through the closed contacts U-1 and the normally closed contacts D-2. In addition, the solenoid 310 for the lubricant supplying valve is energized directly through the closed contacts U-1 thus assuring that lubricant is supplied to the ram way surfaces and elevating nut.

On the other hand, if the hand lever 372 is shifted downwardly, or diagonally to the left or right and downwardly, the switch D is actuated causing the normally open contacts D-1 to close and the normally closed contacts D-2 to open. In this instance, the open contacts D-2 prevent energization of the "up" clutch coil 242, while the "down" clutch coil 246 is energized through the now closed contacts D-1 and the normally closed contacts U-2. Accordingly, the ram 43 is fed downwardly at a rate dependent upon the rotational setting of the hand knob 326 and the combined actuation pattern of the switches S1, S2, S3, and S4 in the feed selector assembly 68.

It will also be observed that at this time the solenoid 310 is energized through the now closed contacts D-1 so that lubricant is supplied to the ram way surfaces and elevating nut.

Now, if during the time that the ram is being fed one of the dogs 405a on a trip ring 405 carried by the ram-position indicating scale member 440 should engage the follower cylinder, then the switch RP will be actuated, thus opening the normally closed contacts RP-2 and closing the normally open contacts RP-1. The latter energize the pilot lamp 500 to indicate to the operator that feed motion has been terminated. The contacts RP-2 open to terminate energization of either the clutch coil 242a or 246a, whichever was previously energized.

To move the ram from a position in which it has been automatically stopped, the operator need only depress the push button 354 (Fig. 14) in the center of the knob 326 to actuate the switch O, thereby closing the contacts O-1 which bypass the now open contacts RP-2. One of the clutches 246a or 242 is then energized so that ram feed resumes.

If at any time the operator should desire to accurately position the ram by manually rotating the hand wheel 64, he pushes the latter inwardly to mesh the gear 291 with gear 52 (Fig. 3). This, as seen from Fig. 7, results in the actuation of the switch 295. Its normally closed contacts (Fig. 28) thus open and prevent energization of either the clutch 242a or 246a. It is impossible, therefore, to have power feed of the ram whenever the hand wheel is shifted inwardly from its neutral position to afford manual feed.

The circuit connections for the saddle direction-controlling clutches 275a and 276a are similar to those described above for the ram controlling clutches. As shown in Fig. 28, the saddle "in" clutch coil 275a is connected to the line L2 and thence in series through the normally closed contacts OT–2, the parallel combination of the normally open contacts OT–1 and I–1, through the normally closed contacts SP–2, and thence through the normally closed contacts 296 controlled by the hand wheel position to the line L1. Similarly, the saddle "out" clutch coil 276a is connected in series through the normally closed contacts I–2, the parallel combination of normally open contacts I–1 and OT–1 and thence to the line L1 through normally closed contacts SP–2 and 296. The override contacts O–2 are connected in parallel with the normally closed contacts SP–2. The normally open saddle positioning contacts SP–1 are connected in parallel with the contacts RP–1 to thus energize the pilot lamp 500 whenever feed is automatically terminated.

Thus, with the direction selector lever 372 shifted to the left from its centered position, the switch I is actuated, causing the normally closed contacts I–2 to open and prevent energization of the "out" clutch coil 276a. The "in" clutch coil 275a is then energized through the now closed normally open contact I–1 and the normally closed contacts OT–2, while the solenoid 311 is energized through the closed contacts I–1 to open the lubricant controlling valve which supplies lubricant to the saddle way surfaces and lead screw nut. Conversely, if the manual swivel lever 372 is shifted to the right, the switch OT is actuated so that the "in" clutch coil 275a is disconnected by the open contacts OT–2, and the "out" clutch coil 276a is energized through the now closed contacts OT–1 and the normally closed contacts I–2. Again, the lubricant controlling solenoid 311 is energized through the now closed contacts OT–1.

If at any time while saddle feed is taking place one of the dogs 405a on the trip rings 405 carried by the scale member 400 should engage the follower cylinder 420 and thus actuate the switch SP, the normally closed contacts SP–2 open to drop out the energized clutch 275a or 276a, thereby terminating the feed movement. The saddle may be moved from a position in which it is thus automatically stopped by depressing the push button 354 in the center of the rotary selector knob 326, thereby closing the normally open contacts O–2 to again energize either of the clutches 275a or 276a. It will be observed, also, that when the saddle feed is automatically terminated by actuation of the switch SP, the normally open contacts SP–1 close to energize the pilot lamp 500, thus indicating to an operator that the feed movement has ceased.

The following chart will summarize and correlate the switch actuation, clutch actuation, and swivel lever deflection necessary to produce the eight possible feed directions for the turret 60 and tool holder 40:

| Deflection of Swivel Lever 372 | Direction Switch Condition: O=normal; X=actuated | | | | Direction Clutch Condition: O=deenergized; X=energized | | | | Direction Of Feed For Tool Holder 40 |
| --- | --- | --- | --- | --- | --- | --- | --- | --- | --- |
| | U | D | I | OT | 242 | 246 | 275 | 276 | |
| Centered | O | O | O | O | O | O | O | O | Stationary. |
| Up | X | O | O | O | X | O | O | O | Up. |
| Down | O | X | O | O | O | X | O | O | Down. |
| Left | O | O | X | O | O | O | X | O | Left. |
| Right | O | O | O | X | O | O | O | X | Right. |
| Up—Left | X | O | X | O | X | O | X | O | Diag. Up—Left. |
| Up—Right | X | O | O | X | X | O | O | X | Diag. Up—Right. |
| Down—Left | O | X | X | O | O | X | X | O | Diag. Down—Left. |
| Down—Right | O | X | O | X | O | X | O | X | Diag. Down—Right. |

If the operator should desire to manually feed the saddle 47 by rotating the hand wheel 64, he pulls the latter outwardly from its neutral position, thus causing the switch 296 (Fig. 7) to be actuated. This opens the normally closed contacts 296 (Fig. 28), positively preventing energization of either the clutch coil 275a or 276a. Accordingly, it is impossible for power feed of the saddle to take place while manual feed is occurring with the hand wheel 64 pulled outwardly from its neutral position.

It is to be particularly noted that this very simple control circuit when taken in combination with the bi-directional overrun devices and electro-magnetic clutches described, and the small rotary feed selector and swivel direction selector results in the utmost convenience and flexibility. Feed may be made at any one of a great number of rates simply by finger-tip setting of the feed selector 68; and changes in feed rates may be made while the parts are in motion since all gears in the transmission are permanently meshed. The use of the bi-directional overrun devices makes it possible to effect a speed change ratio simply by energizing or deenergizing an electro-magnetic clutch rather than complementally energizing or shifting two clutches, as is conventional. The particular arrangement permits feed to continue even though the table is reversely driven and the input bevel gear to the feed transmission turns in the opposite direction.

Direction selection is especially convenient since only finger-tip movement of the swivel lever 372 in the direction control assembly 69 is required. But four small switches, each having two contacts, are required to permit selection of eight possible feed directions. Automatic feed stoppage or positioning of the translatable elements is achieved with the very simplest components and controls by utilizing the position of the indicator scale to determine the points at which a tripping switch is actuated. It is possible to adjust the predetermined stopping points quickly and conveniently by using the same hand tool to release the clamping means and rotationally turn dog rings relative to the scale members.

While the feed transmission, direction selection and automatic positioning controls have been described with regard to the right head 62 (Fig. 1), it will be obvious to those skilled in the art that substantially the same organization and controls are employed for the other two heads 51 and 58 in the exemplary machine tool illustrated by Fig. 1. And while the invention has been described with reference to a vertical turret lathe, it may be applied with equal advantage to various other machine tools.

I claim:

1. In a machine tool having a prime mover, a translatable element, and a position indicator for said element movable in proportion to the element; the combination comprising a multiple ratio feed transmission drivingly interposed between the prime mover and the translatable element, said transmission including reversing gearing and a pair of electric clutches for moving the element optionally in opposite directions, a pair of switches connected in series with respective ones of said clutches, means for complementally actuating said switches to selectively energize either of said clutches while deenergizing the other so that the translatable element may be moved in either direction, a trip member mounted on said indicator and having a dog projecting therefrom, and a trip switch disposed in the path of said dog to be actuated by the latter when the translatable element is in a predetermined position, said trip switch having normally closed contacts in series with both of said pair of switches so that the energized one of said clutches is deenergized and the element stopped whenever it reaches one of said predetermined positions after approaching from either direction.

2. In a machine tool having a prime mover, a translatable element, and a position indicator scale rotatable in proportion to the element; the combination comprising a multiple ratio feed transmission drivingly interposed between the prime mover and the translatable element, said transmission including reversing gearing and a pair of electric clutches for moving the element optionally in opposite directions, a pair of switches connected in series with respective ones of said clutches, means for complementally actuating said switches to selectively energize either of said clutches while deenergizing the other so that the translatable element may be moved in either direction, a plurality of trip rings mounted on said indicator scale and each having a dog projecting therefrom, and a trip switch disposed in the path of said dogs to be actuated by the latter when the translatable element and the scale are in predetermined positions, said trip switch having normally closed contacts in series with both of said pair of switches so that the energized one of said clutches is deenergized and the element stopped whenever it reaches one of said predetermined positions after approaching from either direction, and means for rotationally phasing said trip rings on said scale to vary the predetermined positions at which the element is stopped.

3. The combination set forth in claim 2 further characterized in that a trip override switch is included, such switch having normally open contacts connected in parallel with the contacts of said trip switch, closure of said switch thus advancing the element from a predetermined position in which it has been stopped.

4. In a machine tool having a first linearly movable element and a second element carried by the first and linearly movable transversely relative to it, the combination with a feed transmission adapted to be powered from a prime mover and to translate said elements at a plurality of selectable rates, said transmission including a first pair of electric clutches and reversing gearing associated therewith for moving the first element in opposite directions, a second pair of electric clutches and reversing gearing associated therewith for moving the second element in opposite directions, a first pair of switches for respectively controlling the energization of said first pair of clutches, a second pair of switches for respectively controlling the energization of said second pair of clutches, a direction selector assembly including said first and second pairs of switches and a single lever swivelable from a central position, and means movable with said lever as it is displaced optionally in eight directions from center for actuating each of said switches singly and actuating said switches in four groups of two, each group including one switch from each of said first and second pairs, whereby said second element may be made to move in any of eight directions corresponding to the directions of displacement of said lever.

5. In a machine tool having an element slidably translatable on way surfaces and a prime mover for traversing the same, the combination comprising a multiple ratio feed transmission interconnecting the translatable element and the prime mover, said transmission including reversing gearing and a pair of electric clutches for moving the element in opposite directions, a pair of switches each having normally open and normally closed contacts, circuit means connectable to a voltage source including the normally open contacts of said switches in parallel and the normally closed contacts of said switches in series with the parallel contacts and with respective ones of said clutches, means for complementally actuating said switches, a valve controlled by a solenoid and adapted to supply lubricant to the way surfaces, and circuit means connectable to a voltage source including said parallel normally open contacts in series with said solenoid, whereby said solenoid is energized whenever either of said switches is actuated and the machine tool element is moved in either direction.

6. In a machine tool feed transmission, the combination comprising a plurality of two-way overrun devices each having three rotary elements and including means for transmitting torque from one element alternatively through the other two depending upon their relative rotational speeds, a corresponding plurality of electric clutches each associated with one of said overrun devices, permanently meshed gearing connected with each of said clutches for changing the relative speeds of two elements of the associated overrun device as the clutch is engaged and disengaged, means connecting said gearing in tandem relation, and a rotary selector switch assembly having a knob and a plurality of switches actuated in permutated patterns according to the angular setting of said knob, and means connecting said switches in control of respective ones of said clutches.

7. In a machine tool feed transmission, the combination comprising a plurality of two-way overrun devices each having three rotary elements and including means for transmitting torque from one element alternatively through the other two depending upon their relative rotational speeds, a corresponding plurality of electric clutches each associated with one of said overrun devices, permanently meshed gearing connected with each of said clutches for changing the relative speeds of two elements of the associated overrun device as the clutch is engaged and disengaged, means connecting said gearing in tandem relation, and a rotary selector switch assembly having a knob and a plurality of switches actuated in permutated patterns according to the annular setting of said knob, and means connecting said switches in control of respective ones of said clutches to energize said clutches in various combinations so as to produce different over-all speed change ratios.

8. In a machine tool having a first movable element and a second element carried by the first and movable transversely relative to it, the combination comprising a feed transmission adapted to drive said elements from a prime mover, said transmission including reversing gearing and a first pair of electric clutches for moving the first element in respectively opposite directions, reversing gearing and a second pair of electric clutches for moving the second element in respectively opposite directions, a first pair of switches having normally open contacts in series with respective ones of said first pair of clutches, a second pair of switches having normally open contacts in series with respective ones of said second pair of clutches, a direction selector including a frame, a lever swivelably mounted in said frame, means mounting said first pair of switches diametrically opposite said lever in said frame, means mounting said second pair of switches diametrically opposite said lever in said frame but spaced 90° around the lever from the switches of the first pair, and a wobble plate on said lever adapted when the latter is shifted from a center position to actuate said switches singly or in four combinations of two, one from each of said pairs of switches, whereby said second element may be moved optionally in eight directions corresponding to eight positions of said lever.

9. In a machine tool having a prime mover, a first linearly translatable element and a second element linearly translatable at right angles relative to the first, a feed transmission comprising, in combination, a plurality of bi-directional overrunning devices connected in tandem relation, a corresponding plurality of electro-magnetic clutches for said overrunning devices each operative upon energization and deenergization thereof to produce a change in the transmission ratio, a first shaft drivingly connected to translate the first element, a second shaft drivingly connected to translate the second element, a first pair of electro-magnetic clutches connected between the last overrunning device and said first shaft with a reversing idler associated with one clutch, and a second pair of electro-magnetic clutches connected between the last overrunning device and the second shaft with a second reversing idler associated with one clutch, whereby the second of the machine tool elements may be fed at a plurality of rates depending upon the energization combination of said plurality of clutches, and in any one of eight directions depending upon the energization combination of said first and second pairs of clutches.

10. In a machine tool having a translatable tool holder and a prime mover, a feed transmission comprising, in combination, a bi-directional clutch including a hexagonal member, a hollow overrunning member having a cylindrical inner surface and an integral gear on its outer surface, a drive member having a three-pronged head, and three wedging rollers; said head being rotatably received within said overrunning member with the prongs thereof embracing said hexagonal member and the rollers disposed between the opposed sides of the prongs; said hexagonal member, overrunning member, drive member, and rollers being dimensioned and arranged to prevent relative rotation between the hexagonal and drive members and to transmit torque between those members and the overrunning member only when the latter tends to rotate more slowly than those members, a second gear, an electro-magnetic clutch disengageably connecting said second gear and said driver member, a gear couplet having two gears meshed respectively with said integral and second gears and sized to cause said integral gear to rotate more slowly than said second gear, means for drivingly connecting said second gear to the prime mover, and means for drivingly connecting said hexagonal member upon rotation thereof to translate the tool holder, whereby energization and deenergization of said electromagnetic clutch changes the feed rate of the translatable element by a ratio equal to the ratio of speeds of said integral and second gears.

11. In a machine tool having a translatable element and a rotary prime mover, a feed transmission comprising, in combination, a bi-directional overrun device having first, second and third rotary members and including means for preventing relative rotation of said first and third members and transmitting torque between those members and said second member only when the second tends to rotate more slowly than the first and third, a first gear rotatable with said second member, a second gear and clutch means disengageably connecting it to said third member, a gear cluster having two gears permanently meshed respectively with said first and second gears and having relative diameters such that the first gear rotates at a speed less than that of the second gear, means drivingly connecting said second gear with the prime mover, and means drivingly connecting said first member upon rotation thereof to translate the machine tool element.

12. In a machine tool having a prime mover and a translatable element, a feed transmission for connecting said prime mover and said element and comprising, in combination, a bi-directional overrun device having first, second, and third rotary members and including means for preventing relative rotation of the first and third members but transmitting torque between those members and the second member only when the second tends to rotate more slowly than the first and third, means for driving said first member from said prime mover, a first gear rotatable with said second member, a second gear and a clutch disengageably connecting it to said third of said members, and a gear cluster having gears permanently meshed with said first and second gears such that the former rotates faster than the latter, and means connecting said cluster upon rotation thereof to translate said element.

13. In a machine tool having a translatable element and a rotary prime mover, a feed transmission comprising, in combination, a bi-directional overrun device having first, second and third rotary members and including means for preventing relative rotation of the first and third members, for preventing torque transmission directly between the second and third members, but for transmitting torque between the first and second members only when the first member tends to be driven faster than the second and when the second member tends to be driven faster than the first, a first gear rotatable with said second member, a second gear and a clutch disengageably connecting it to one of said members other than the second member, gear means permanently meshed with said first and second gears for rotating them at different speeds, and means drivingly connecting said first and third members between the prime mover and the translatable element to feed the latter at either of two speeds depending upon whether said clutch is engaged or disengaged.

14. In a machine tool having a movable element, the combination comprising means including a feed transmission for moving the element, a cylindrical scale and means connecting the same to rotate in proportion to movement of the element for indicating the position of the latter, a plurality of rings rotatably supported concentrically about and stacked axially along said scale, each of said rings having a radial projection, a yieldably deflectable member disposed in the paths of said projections to be shifted by the latter, means responsive to shifting of said member for interrupting said transmission and stopping the element in predetermined positions according to the angular positions of said projections relative to said scale, a clamping member operable by the use of a hand tool to lock and release said rings to and from said scale, each of said rings having at least one radial notch in its periphery adapted to receive the same hand tool to permit rotational adjustment of the ring relative to the scale when said clamping member is unlocked.

15. In a machine tool having a linearly movable element, the combination of means including a feed transmission for moving the element, a cylindrical scale rotatable in proportion to movement of the element for indicating the position thereof, a plurality of trip rings concentrically disposed about and axially stacked along said scale, said rings being rotatable relative to the scale, means for releasably locking said rings rigid with said scale, a radial projection on each of said rings, a movable arm disposed in the paths of said projections, and means responsive to deflection of said arm by each of said projections for interrupting said transmission and stopping the element in respective predetermined positions, said predetermined positions being adjustable by rotationally setting said rings relative to said scale when said locking means are released.

16. An electrical direction selector assembly comprising, in combination, a frame having a central passageway therein, a hand lever projecting into said passageway and swivelably retained by ball and socket means, an annular wobble plate telescoped over said lever and movable transversely in said frame, four switches mounted on said frame and having yieldable actuators projecting inwardly toward said wobble plate at 90° intervals therearound, said plate being formed with an annular V-shaped groove in one face thereof concentrically surrounding a beveled retaining surface, and four detents carried by said frame and disposed about said lever opposite the four switch actuators, means yieldably biasing said detents axially into said groove, said detents yieldably engaging said retaining surface when said wobble plate is shifted toward them, whereby said wobble plate may be shifted in eight directions to actuate said four paired switches singly and in four combinations upon deflection of said lever, and said wobble plate is retained more firmly in its centered position and in its deflected positions.

17. In a machine tool having a linearly movable element, the combination of means for translating said element, a cylindrical scale and means for rotating the same through angles proportional to the linear movement of the element to indicate the position of the latter, said scale being located remote from said element and at an operator's control station, a plurality of members which are relatively thin as compared to the axial length of the scale stacked axially on said scale and individually adjustable rotationally relative to the latter, means for locking said members in selected positions of rotational adjustment on the scale so that they rotate with the latter, each of said members having a portion of abruptly changing radius as referred to the axis of said scale, means yieldably disposed in the rotational paths of said changing radius portions, and means responsive to the deflection of said last-named means by said portions for interrupting said translating means and thus stopping said element in positions predetermined by the rotational adjustments of said members relative to said scale.

18. In a machine tool transmission, the combination comprising a plurality of overrun devices each having a driver member and an overrunning member, permanently meshed gearings associated with said overrun devices, a plurality of electric clutches each associated with one of said overrun devices and connected when engaged to cause the overrunning member to rotate faster than the associated driver member, said gearing providing output drive through said driver member when said clutch is engaged and output drive through said overrunning member when said clutch is disengaged, means connecting said gearings in tandem relation, and a rotary selector switch assembly having a knob and a plurality of switches actuated in permutated patterns according to the settings of said knob, and means connecting said switches in control of respective ones of said clutches.

References Cited in the file of this patent

UNITED STATES PATENTS

| | | |
|---|---|---|
| 1,502,915 | Neuwerk | July 29, 1924 |
| 2,000,448 | Keil | May 7, 1935 |
| 2,678,974 | Mason | May 18, 1954 |
| 2,679,678 | Stephan | June 1, 1954 |

FOREIGN PATENTS

| | | |
|---|---|---|
| 605,380 | Great Britain | July 22, 1948 |